(12) United States Patent
Xie

(10) Patent No.: US 12,191,771 B2
(45) Date of Patent: Jan. 7, 2025

(54) CIRCUIT PATH CONFIGURATION FOR ENHANCING OVERVOLTAGE PROTECTION IN A SWITCHING POWER SUPPLY

(71) Applicant: Power Integrations, Inc., San Jose, CA (US)

(72) Inventor: Houlin Xie, Shenzhen (CN)

(73) Assignee: Power Integrations, Inc., San Jose, CA (US)

( * ) Notice: Subject to any disclaimer, the term of this patent is extended or adjusted under 35 U.S.C. 154(b) by 177 days.

(21) Appl. No.: 17/908,053

(22) PCT Filed: Mar. 18, 2021

(86) PCT No.: PCT/US2021/022924
§ 371 (c)(1),
(2) Date: Aug. 30, 2022

(87) PCT Pub. No.: WO2021/194838
PCT Pub. Date: Sep. 30, 2021

(65) Prior Publication Data
US 2023/0117578 A1 Apr. 20, 2023

Related U.S. Application Data

(60) Provisional application No. 62/993,803, filed on Mar. 24, 2020.

(51) Int. Cl.
*H02M 3/335* (2006.01)
*H02M 1/32* (2007.01)
(52) U.S. Cl.
CPC ............. *H02M 3/335* (2013.01); *H02M 1/32* (2013.01); *H02M 3/33507* (2013.01)

(58) Field of Classification Search
CPC ..... H02M 3/33507; H02M 1/32; H02M 3/335
See application file for complete search history.

(56) References Cited

U.S. PATENT DOCUMENTS 6,304,462 B1 10/2001 Balakrishnan et al.
10,110,216 B1 10/2018 Knoedgen et al.
(Continued)

FOREIGN PATENT DOCUMENTS

| CN | 101902126 A | 12/2010 | |
|---|---|---|---|
| CN | 104467440 A * | 3/2015 | ........ H02M 3/33569 |
| EP | 2128968 A2 | 12/2009 | |

OTHER PUBLICATIONS

Alexandru Iordache Cosmin et al: "Variable regulated high voltage power supply", Jun. 30, 2016 (Jun. 30, 2016), figure 4; pp. 1-6.
(Continued)

*Primary Examiner* — Harry R Behm
(74) *Attorney, Agent, or Firm* — Brian H. Floyd

(57) ABSTRACT

Presented herein is a circuit path configuration for enhancing overvoltage protection in a switching power supply, the switching power supply comprising a bridge rectifier, a primary side switch, and a controller. The circuit path configuration implements input OVP by availing a clamping voltage indicative of a drain-to-source voltage of the primary side switch. The bridge rectifier provides a rectified voltage to a first node. The primary side switch comprises a drain; and the drain is electrically coupled to the first node via a first circuit path. The first circuit path comprises a first circuit path node between the first node and the drain. The controller comprises a voltage monitor input electrically coupled to the first circuit path node via a second circuit path; and the second circuit path provides a monitor voltage to the voltage monitor input.

15 Claims, 15 Drawing Sheets

(56) References Cited

U.S. PATENT DOCUMENTS

| | | | |
|---|---|---|---|
| 2006/0109691 A1* | 5/2006 | Strijker | H02M 3/33507 363/1 |
| 2009/0268489 A1 | 10/2009 | Lin et al. | |
| 2011/0025278 A1* | 2/2011 | Balakrishnan | H02M 1/32 320/166 |
| 2016/0056704 A1* | 2/2016 | Deboy | H02M 3/33523 363/21.13 |
| 2018/0069480 A1 | 3/2018 | Koo et al. | |
| 2019/0013739 A1 | 1/2019 | Hari et al. | |

OTHER PUBLICATIONS

PCT Application No. PCT/US2021/022924; International Preliminary Report on Patentability; Oct. 6, 2022; 8 pages.
PCT Application No. PCT/US2021/022924; International Search Report of the International Searching Authority; Jun. 21, 2021; 4 pages.
PCT Application No. PCT/US2021/022924; Written Opinion of the International Searching Authority; Jun. 21, 2021; 7 pages.
Power Integrations, "TOP264-271 TOPSwitch-JX Family Integrated Off-Line Switcher with EcoSmart™ Technology for Highly Efficient Power Supplies", Rev. F May 2015, 40 pages.

* cited by examiner

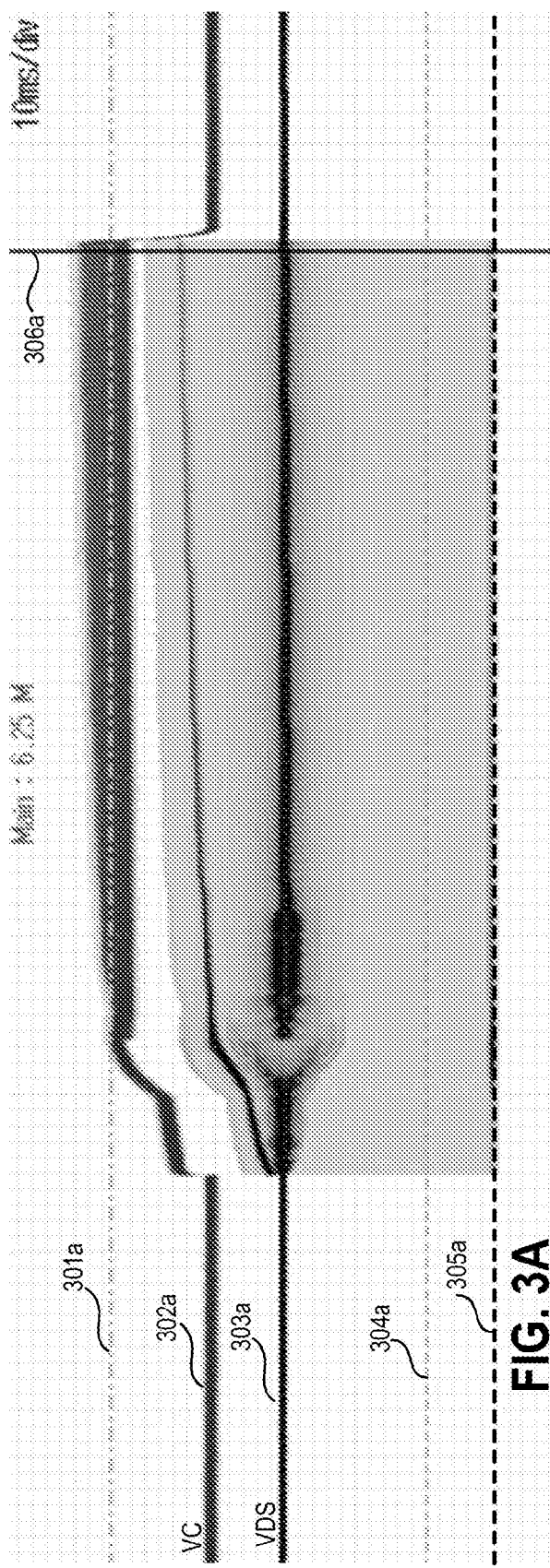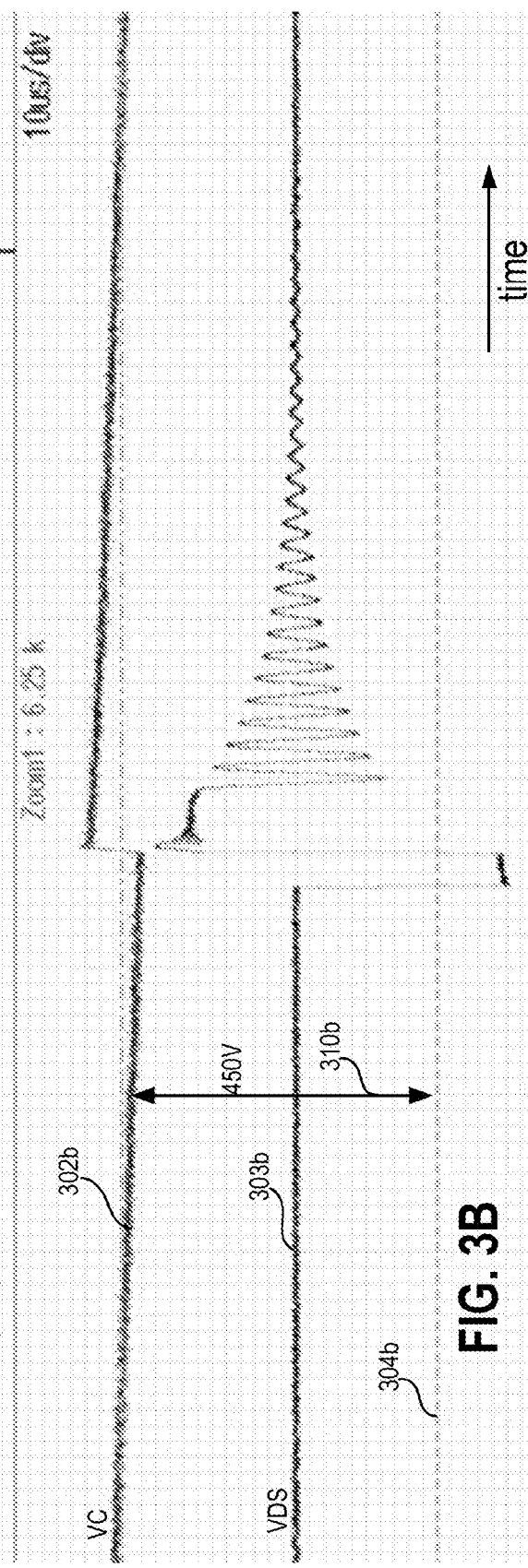

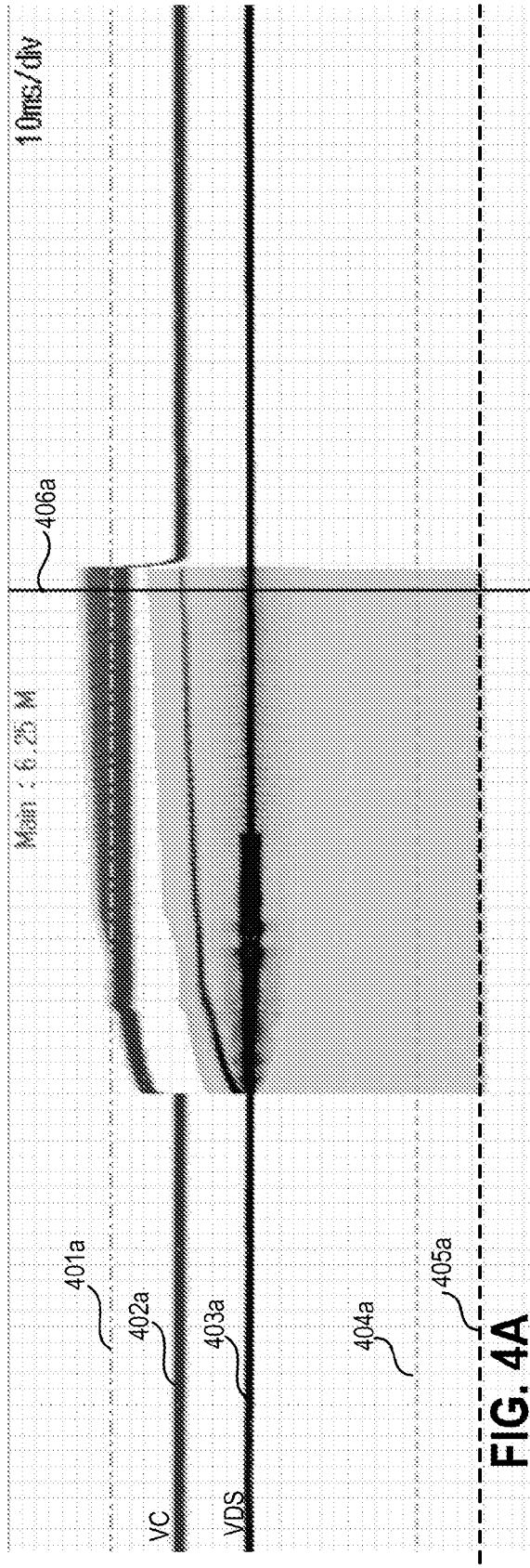
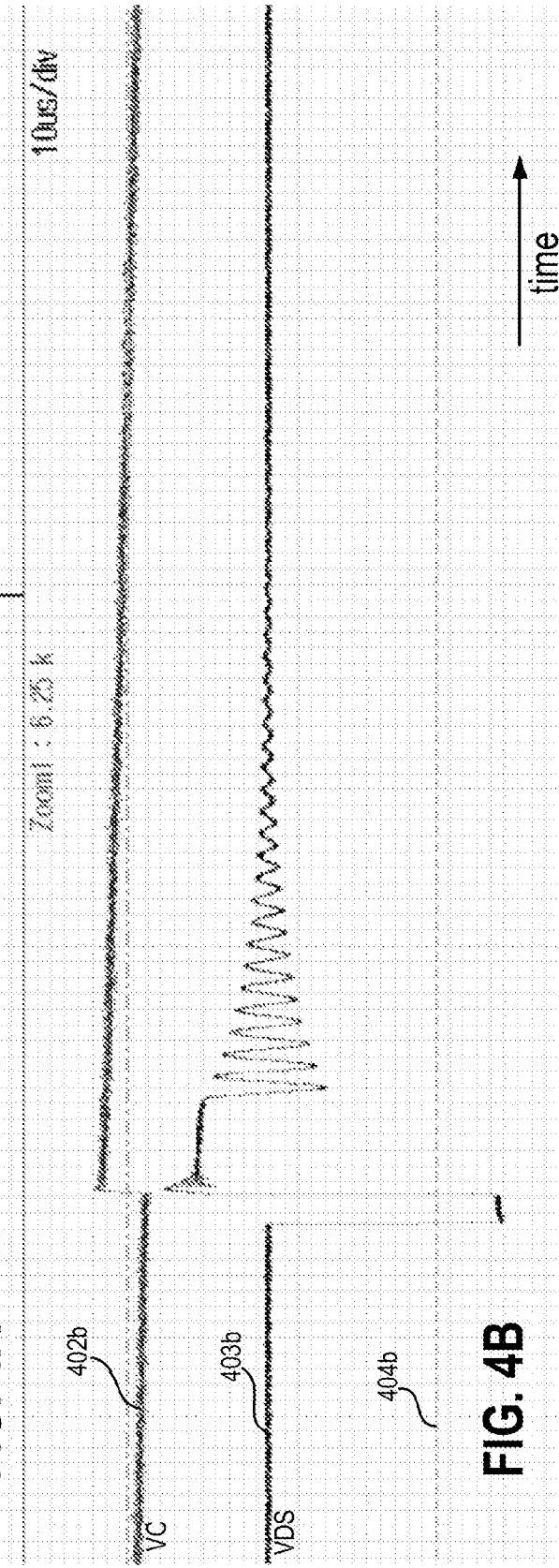
FIG. 4A
FIG. 4B

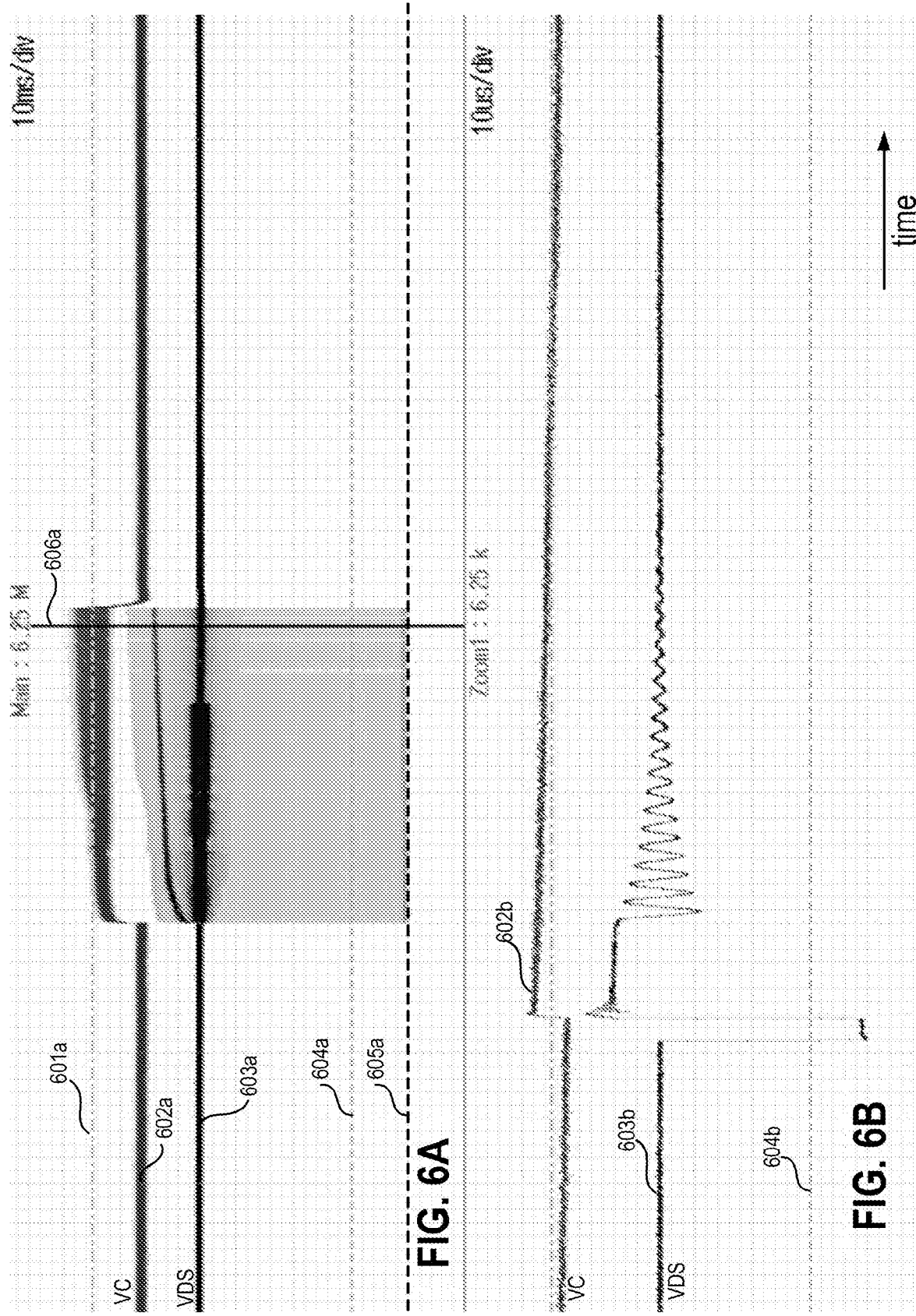

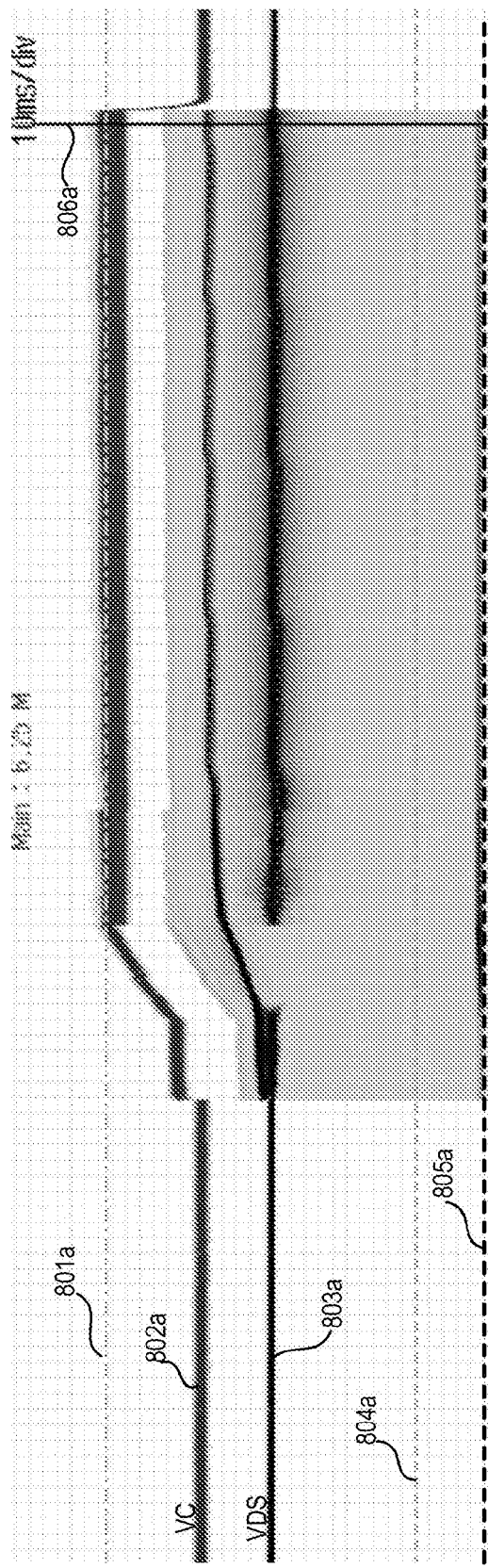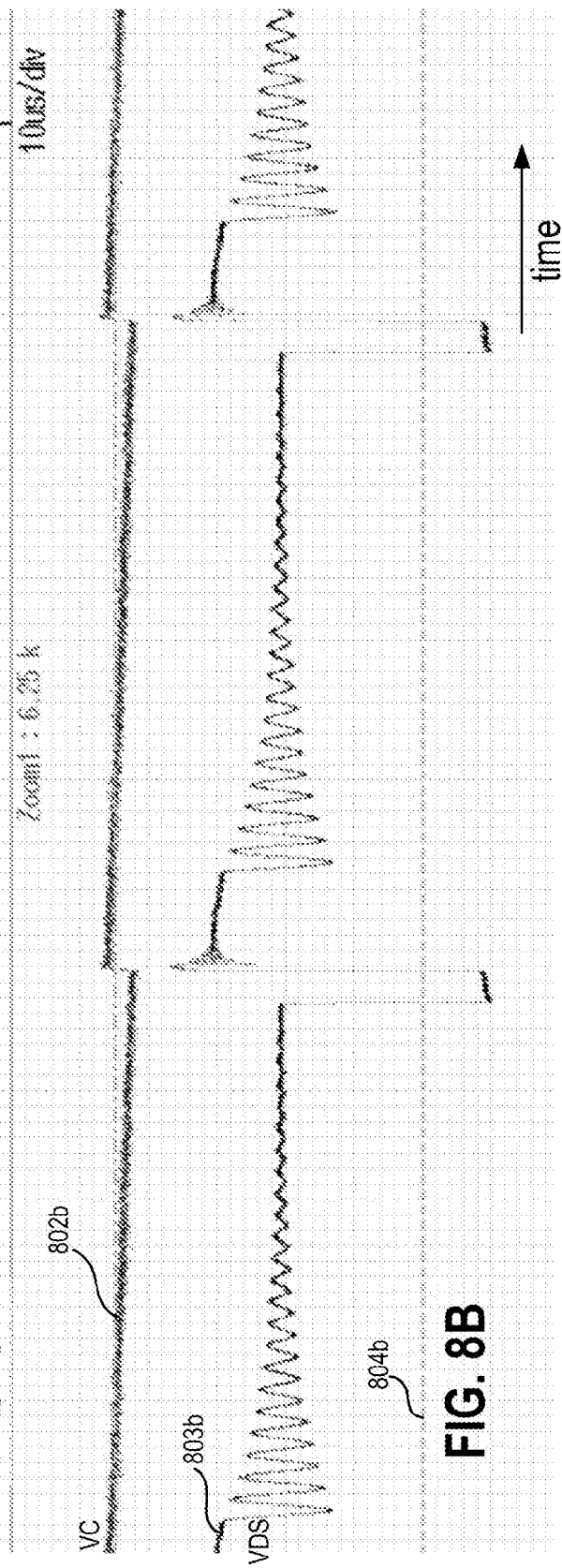

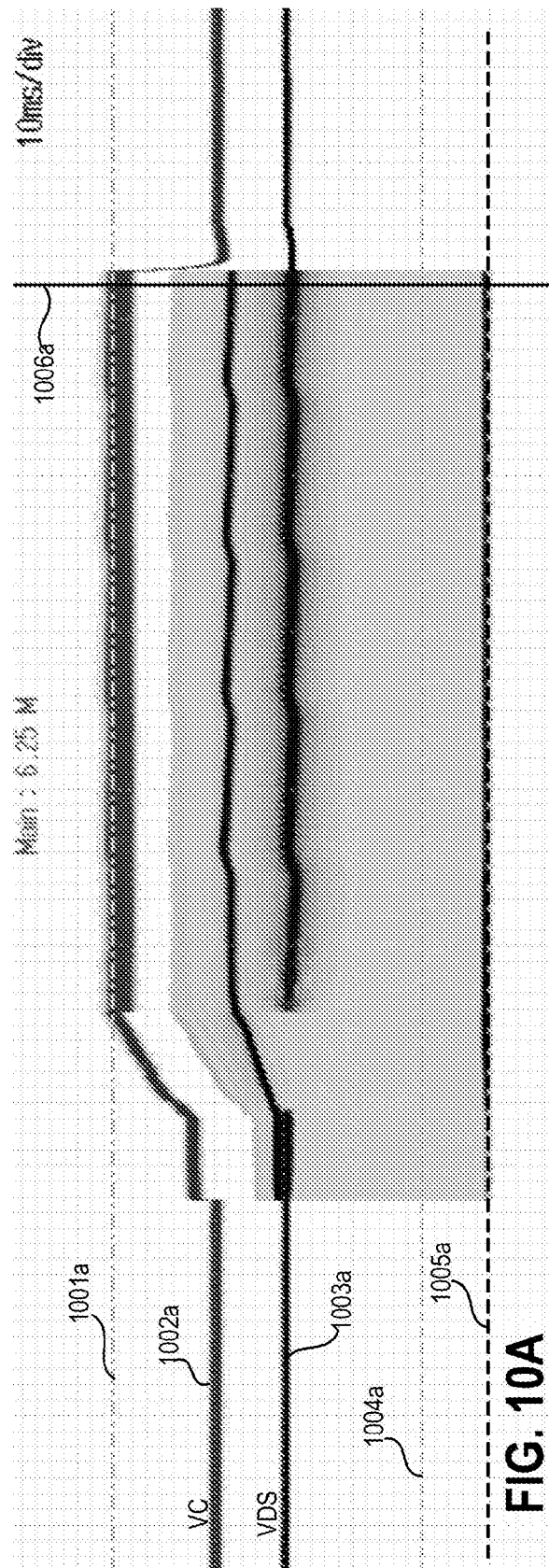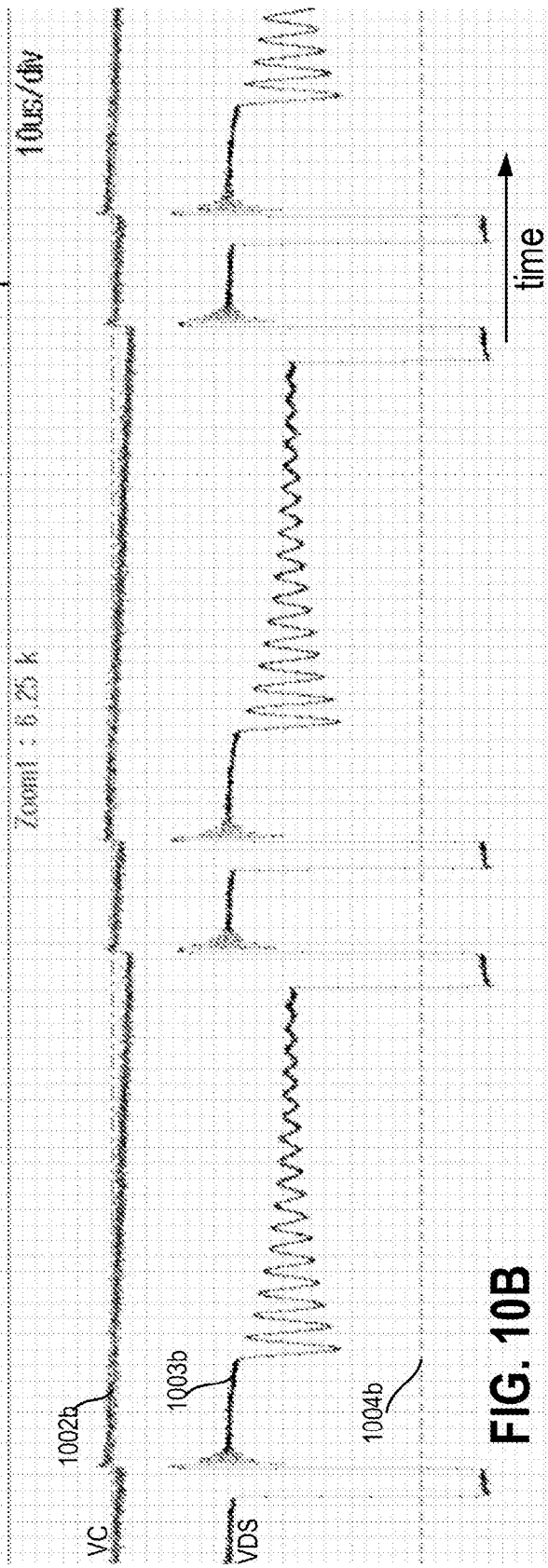
FIG. 10A
FIG. 10B

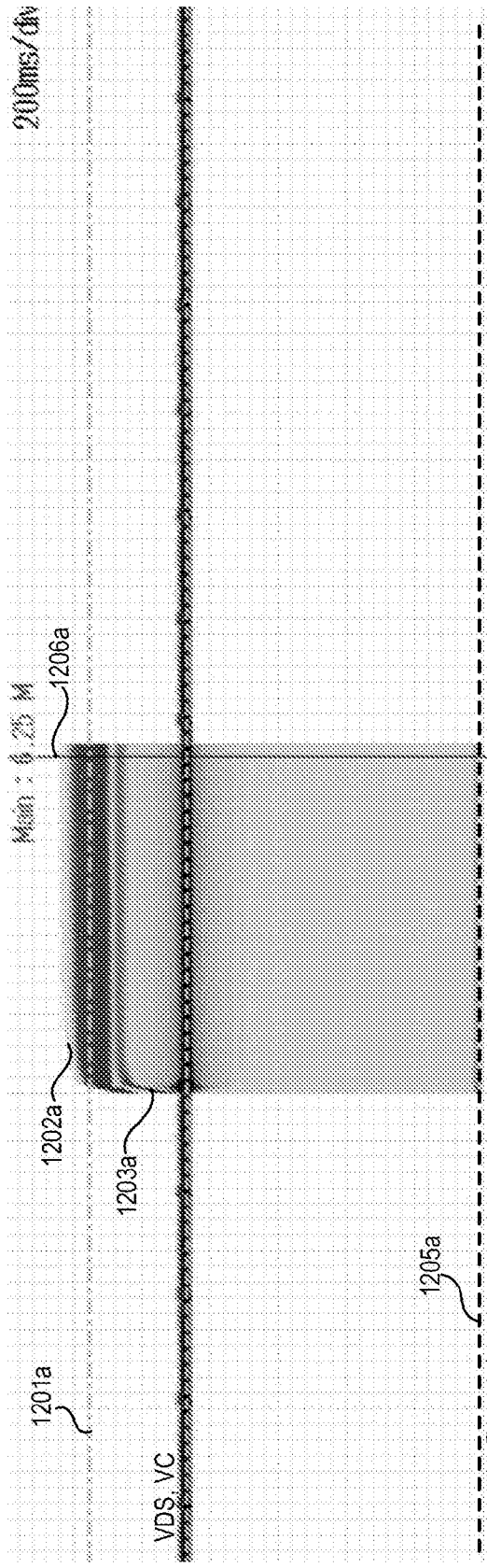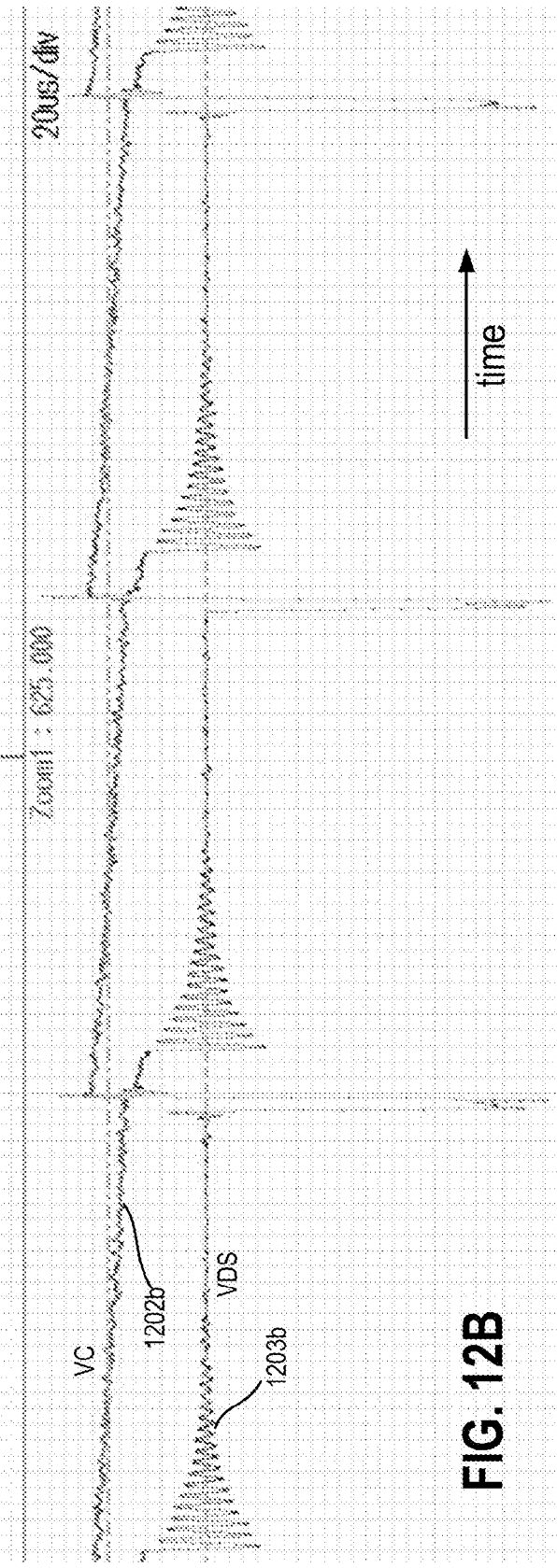
FIG. 12A
FIG. 12B

CIRCUIT PATH CONFIGURATION FOR ENHANCING OVERVOLTAGE PROTECTION IN A SWITCHING POWER SUPPLY

CROSS-REFERENCE TO RELATED APPLICATIONS

This application is a National Stage Entry of International Patent Application No. PCT/US2021/022924, filed on Mar. 18, 2021, which claims priority from U.S. Provisional Application No. 62/993,803 filed on Mar. 24, 2020, incorporated in their entirety herein by reference.

FIELD OF THE DISCLOSURE

The present invention relates to a switching power supply and more particularly to configuring a circuit path to enhance overvoltage protection of a primary side switch.

BACKGROUND INFORMATION

Many electronic devices, such as mobile phones, laptop computers, etc., are powered by direct current (dc) power derived from a power supply. Conventional wall outlets generally deliver a high voltage alternating current (ac) power that needs to be converted to regulated dc power in order to be used as a power source for consumer electronic devices. Switching (switch-mode) power supplies are commonly used due to their high efficiency, small size, and low weight to convert a high voltage ac power to a regulated dc power.

Switching power supplies may be configured as switch-mode converters, also referred to as switching converters, and may include coupling elements such as transformers. Switch-mode converters may be further configured as flyback converters to convert rectified alternating current (AC) power into regulated direct current (DC) output power.

In some applications alternating current (AC) power may be rectified by a bridge rectifier and filtered by a bulk capacitor to provide unregulated rectified AC power to the switch-mode converter (e.g., flyback converter).

BRIEF DESCRIPTION OF THE DRAWINGS

Non-limiting and non-exhaustive embodiments of a circuit path configuration for enhancing overvoltage protection in a switching power supply are described with reference to the following figures, wherein like reference numerals refer to like parts throughout the various views unless otherwise specified.

FIG. 3A illustrates waveforms corresponding to clamp voltage VC and to primary side switch drain-to-source voltage VDS according to a first embodiment.

FIG. 3B illustrates waveforms corresponding to clamp voltage VC and to primary side switch drain-to-source voltage VDS according to the first embodiment.

FIG. 4A illustrates waveforms corresponding to clamp voltage VC and to primary side switch drain-to-source voltage VDS according to a second embodiment.

FIG. 4B illustrates waveforms corresponding to clamp voltage VC and to primary side switch drain-to-source voltage VDS according to the second embodiment.

FIG. 6A illustrates waveforms corresponding to clamp voltage VC and to primary side switch drain-to-source voltage VDS according to a fourth embodiment.

FIG. 6B illustrates waveforms corresponding to clamp voltage VC and to primary side switch drain-to-source voltage VDS according to the fourth embodiment.

FIG. 8A illustrates waveforms corresponding to clamp voltage VC and to primary side switch drain-to-source voltage VDS according to a sixth embodiment.

FIG. 8B illustrates waveforms corresponding to clamp voltage VC and to primary side switch drain-to-source voltage VDS according to the sixth embodiment.

FIG. 10A illustrates waveforms corresponding to clamp voltage VC and to primary side switch drain-to-source voltage VDS according to an eighth embodiment.

FIG. 10B illustrates waveforms corresponding to clamp voltage VC and to primary side switch drain-to-source voltage VDS according to the eighth embodiment.

FIG. 12A illustrates waveforms corresponding to clamp voltage VC and to primary side switch drain-to-source voltage VDS according to a tenth embodiment.

FIG. 12B illustrates waveforms corresponding to clamp voltage VC and to primary side switch drain-to-source voltage VDS according to the tenth embodiment.

Figure 1A:
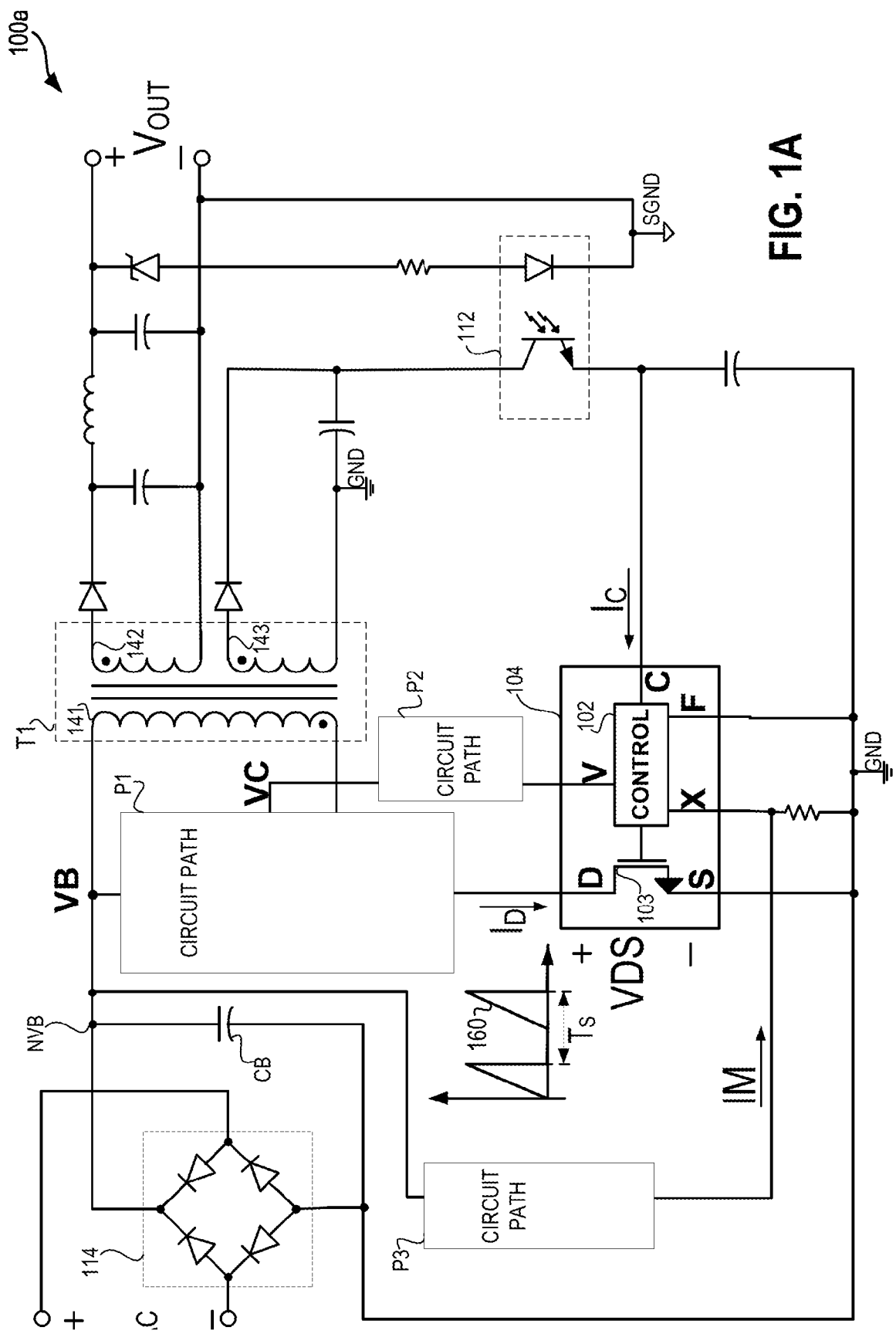
FIG. 1A illustrates a switching power supply including circuit paths according to the teachings herein.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the teachings herein. Also, common but well-understood elements that are useful or necessary in a commercially feasible embodiment are often not depicted in order to facilitate a less obstructed view of these various embodiments of a circuit path configuration for enhancing overvoltage protection in a switching power supply.

DETAILED DESCRIPTION

In the following description, numerous specific details are set forth in order to provide a thorough understanding of a circuit path configuration for enhancing overvoltage protection in a switching power supply. It will be apparent, however, to one having ordinary skill in the art that the specific detail need not be employed to practice the teachings herein. In other instances, well-known materials or methods have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of a circuit path configuration for enhancing overvoltage protection in a switching power supply. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

In the context of the present application, when a transistor is in an "off-state" or "off" the transistor blocks current and/or does not substantially conduct current. Conversely, when a transistor is in an "on-state" or "on" the transistor is able to substantially conduct current. By way of example, in one embodiment, a high-voltage transistor comprises an N-channel metal-oxide-semiconductor (NMOS) field-effect transistor (FET) with the high-voltage being supported between the first terminal, a drain, and the second terminal, a source. In some embodiments an integrated controller circuit may be used to drive a power switch when regulating energy provided to a load.

Also, for purposes of this disclosure, "ground" or "ground potential" refers to a reference voltage or potential against which all other voltages or potentials of an electronic circuit or Integrated circuit (IC) are defined or measured.

In the context of the present application, power may be transferred via an energy transfer element (e.g., a transformer) from an input (e.g., from a primary) side to an output (e.g., to a secondary) side according to a switching cycle. For instance, a primary switch, also referred to as a primary side switch, may switch according to a switching cycle whereby a primary winding receives input power for part of the switching cycle and one or more secondary windings provide power for another part of the switching cycle.

As mentioned above, switching power supplies may include switch-mode converters (switching converters) including energy transfer elements (e.g., transformers and transformer circuits). The switch-mode converter may include a controller and a switch; and the switch-mode converter may be configured as a flyback (flyback converter). Additionally, a transformer may transfer energy from a primary side coupled with a primary side winding to a secondary side coupled with a secondary side winding. Also, as discussed above, a switch-mode converter may receive input power in the form of unregulated power. For instance, the unregulated power may be rectified AC power derived from a bulk capacitor at the output of a bridge rectifier. Additionally, the rectified AC power may comprise a rectified AC line voltage across the bulk capacitor. In this context, the rectified AC line voltage may also be referred to as a bulk capacitor voltage.

A primary side switch may switch energy at the primary side in response to a control signal. For instance, a controller may provide signals to the primary side switch to switch according to a switching cycle. The switching cycle may allow energy (power) to be transferred from the primary side to the secondary side; and the controller may provide signals to the primary switch so as to regulate power delivered to a load on the secondary side.

A controller may also be configured to protect one or more elements (e.g., circuit components) of the switching power supply. For instance, the controller may be configured to avail overvoltage protection (OVP) and/or overcurrent protection (OCP) by monitoring a signal from either the primary side and/or the secondary side. Overvoltage protection (OVP) may be implemented so that the controller turns off the primary side switch when the (monitored) signal exceeds a threshold.

When a signal from the primary side is used to implement OVP, then the approach may be referred to as input OVP. When a signal from the secondary side is used to implement OVP, then the approach may be referred to as output OVP. In many applications input OVP is preferred over output OVP due to reliability concerns. For instance, output OVP may be unreliable for appliance power supplies and lead to device failures and/or breakdown. Additionally, output OVP may be susceptible to accidental or false trigger events leading to poor performance and/or lower conversion efficiency. Therefore, many applications, including appliance power supplies, necessitate input OVP.

Modern switching power supplies implement input OVP by monitoring the bulk capacitor voltage; and as described above, the bulk capacitor voltage can be an unregulated rectified AC line voltage. A purpose of input OVP can be to protect the primary side switch by limiting its maximum drain-to-source voltage in the event of surges. However, using the bulk capacitor voltage may not fully protect against other sources of variability in the drain-to-source voltage. For instance, the drain-to-source voltage may increase not only due to input power surges (i.e., surges in the unregulated rectified AC line voltage) but also do to other overvoltage sources. Other overvoltage sources may include, but are not limited to, reflection voltages from the transformer (e.g., a voltage reflection from the secondary side) and/or peaks in voltage due to transformer parasitics (e.g., a parasitic leakage winding). Accordingly, there is a need to implement input OVP by monitoring a more comprehensive signal from the primary side.

Presented herein is a circuit path configuration for enhancing overvoltage protection in a switching power supply. The circuit path configuration implements input OVP by availing a more comprehensive signal indicative of the drain-to-source voltage on the primary side switch. In the teachings herein, the more comprehensive signal may be referred to as a clamping voltage.

Also, as described herein, a power supply (e.g., a switching power supply) comprises a bridge rectifier, a primary side switch, and a controller. The bridge rectifier is configured to provide a rectified voltage (e.g., an unregulated rectified AC voltage) to a first node (e.g., to a bulk capacitor node). The primary side switch comprises a drain; and the drain is electrically coupled to the first node via a first circuit path. The first circuit path comprises a first circuit path node between the first node and the drain. The controller comprises a voltage monitor input electrically coupled to the first circuit path node via a second circuit path; and the second circuit path is configured to provide a monitor voltage to the voltage monitor input.

FIG. 1A illustrates a switching power supply 100a including circuit paths P1-P3 according to the teachings herein. The switching power supply 100a further includes a bridge rectifier 114, a bulk capacitor CB, a transformer TI, an optocoupler 112, and a switcher core module 104. The transformer TI includes a primary winding 141, a secondary winding 142, and an auxiliary winding 143. The switcher core module 104 includes a controller 102 electrically coupled to a primary side switch 103.

As discussed above the transformer TI may electrically isolate a primary side, referenced to a primary side ground GND, from a secondary side, referenced to a secondary side ground SGND. One of ordinary skill in the art may also recognize that the secondary side ground SGND can be referred to as a "return" ground. As illustrated in FIG. 1A, the primary winding 141 is coupled to the circuit path P1; while the secondary winding 142 is coupled to the secondary SGND. The auxiliary winding 143 may be electrically coupled with and provide power to the optocoupler 112.

The switching power supply 100a, also referred to as a "power supply", is configured as a flyback (i.e., a flyback converter). The bridge rectifier 114 rectifies alternating current (AC) voltage $V_{AC}$ and provides unregulated rectified AC power. As illustrated, the rectified AC power comprises a rectified AC voltage VB which is provided to the bulk capacitor CB. Also as illustrated, the bulk capacitor CB is electrically coupled between a node NVB and a primary side ground GND; and the rectified AC voltage VB is referenced to the primary side ground GND.

The primary side switch 103 is electrically coupled between the primary side ground GND and the first circuit path P1. As illustrated the source S is electrically coupled to the primary side ground GND; and the drain D is electrically coupled to the circuit path P1.

Additionally, the controller 102 is electrically coupled to the primary side switch 103 to switch a drain current Ip. When the controller 102 controls the primary side switch 103 to turn on and off (i.e., to switch) according to a switching cycle, then the drain current Ip may take on a switching waveform 160. According to switch-mode (switching) power supply control theory, the switching may allow energy (i.e., power) to be transferred from the primary winding 141 to the secondary winding 142 and/or the auxiliary winding 143.

Energy transferred to the secondary winding 142 may be used to provide output power with output voltage $V_{out}$. The optocoupler 112 may in turn provide feedback to a control input C of the controller 102 in order to regulate the output voltage $V_{out}$. For instance, in response to a current $I_C$ (i.e., feedback current $I_C$) at the control input C, the controller 102 may drive a gate of the primary side switch 103 according to a switching cycle (e.g., according to a waveform 160 with period $T_S$).

The controller 102 may be further configured to provide additional protection to components of the switching power supply 100a. For instance, the controller 102 includes a voltage monitor input V and a current monitor input X. The controller 102 may receive a monitor voltage at the voltage monitor input V; and in response to the monitor voltage exceeding a limit (e.g., an overvoltage limit), may turn off the primary side switch 103. In this way the controller 102 may limit the drain-to-source voltage VDS from exceeding a drain-to-source voltage limit, thereby availing overvoltage protection to the primary side switch 103. Similarly, the controller 102 may limit a peak value of the drain current IDS based on a current at the current monitor input X.

As illustrated, the circuit path P1 is electrically coupled between the drain D of primary side switch 103 and the node NVB; therefore, the drain D is electrically coupled to the node NVB via the circuit path P1. According to the teachings herein, the circuit path P2 may be electrically coupled with the circuit path P1; and circuit path P1 may provide a clamp voltage VC. The clamp voltage VC may advantageously be provided to the voltage monitor input V via the circuit path P2. The clamp voltage VC may advantageously have comprehensive information (i.e., voltage components) for comparing with an overvoltage threshold.

In some embodiments the switcher core module 104 can be a TOPSwitch™ (and/or embodiments of a TOPSwitch™) switcher core module 104. A TOPSwitch™ switcher core module integrates the primary side switch 103 and the controller 102. (TOPSwitch™ is a trademark of Power Integrations, Inc., 5245 Hellyer Ave., San Jose, CA 95138).

Figure 1B:
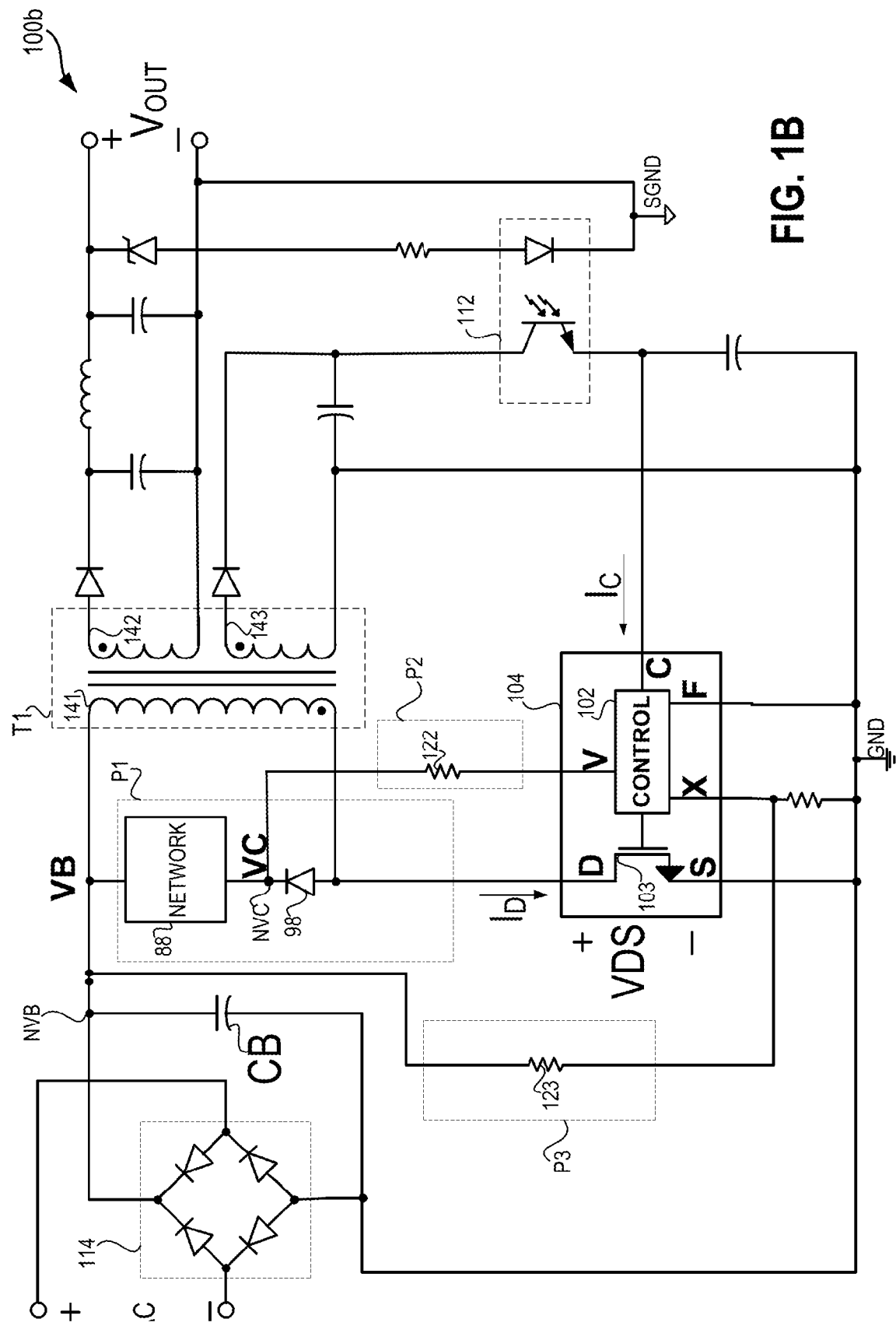
FIG. 1B illustrates a switching power supply including circuit paths according to an embodiment.
Figure 1C:
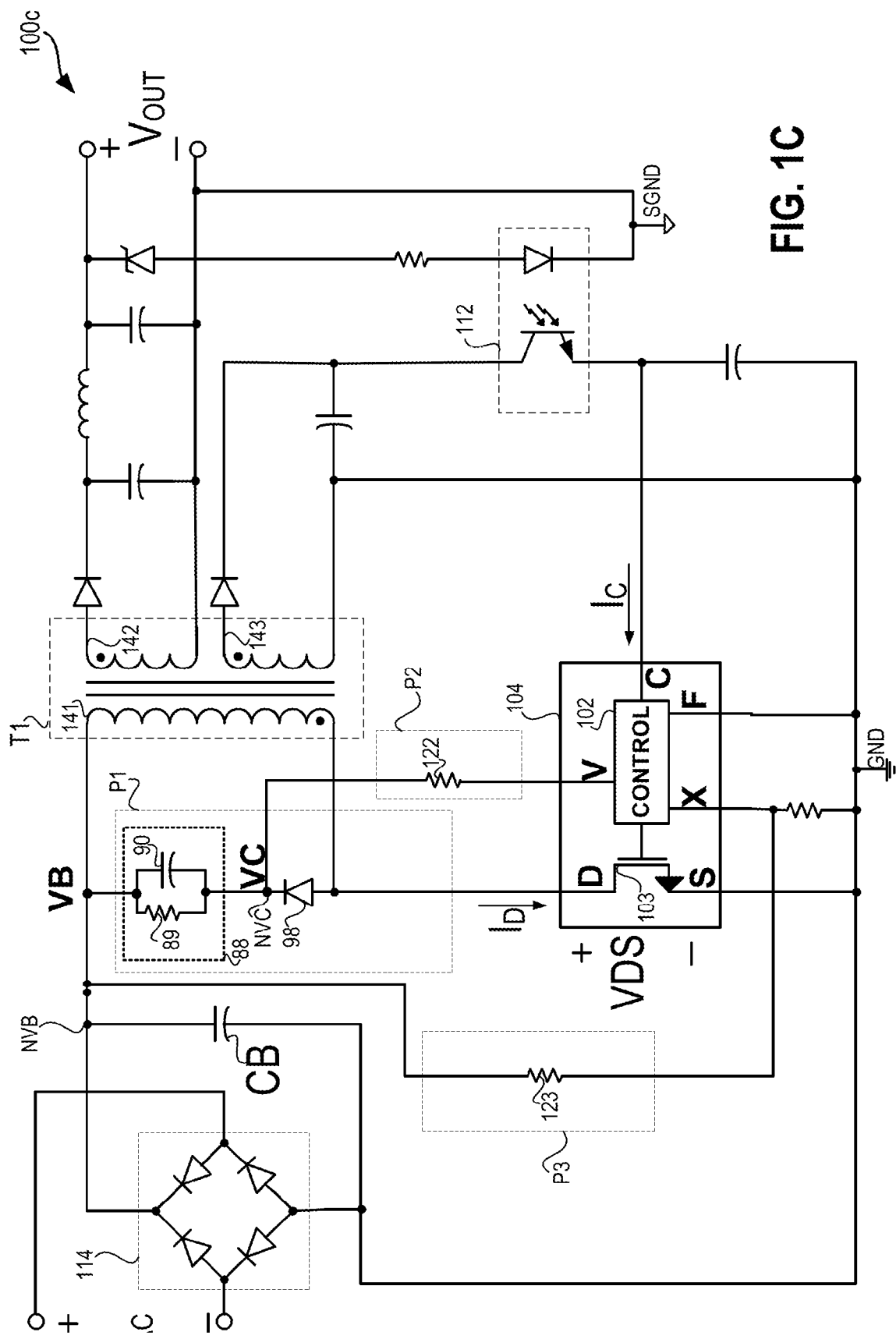
FIG. 1C illustrates a switching power supply including circuit paths according to an embodiment.

FIG. 1B illustrates a switching power supply 100b including circuit paths P1-P3 according to an embodiment; and FIG. 1C illustrates a switching power supply 100c including circuit paths P1-P3 according to an embodiment. As illustrated by switching power supplies 100b-100c circuit path P1 comprises a resistor 123 electrically coupled between current monitor input X and node NVB. Circuit path P3 comprises a diode 98 and circuit network 88 electrically coupled in series between node NVB and the drain D of primary side switch 103. Circuit path P2 comprises a resistor 122 electrically coupled between the voltage monitor input V and a circuit path node NVC. Also, as illustrated the circuit network 88 is electrically coupled between the circuit path node NVC and the node NVB; and a cathode of diode 98 is electrically coupled to the circuit path node NVC. The anode of diode 98 is electrically coupled to the drain D. As further illustrated by switching power supply 100c, the circuit network 88 may comprise a capacitor 90 and a resistor 89 electrically coupled in parallel.

According to the teachings herein, the voltage monitor input V couples to the circuit path node NVC via circuit path P2 (e.g., via a resistor 122). The circuit path node NVC may advantageously provide a clamp voltage VC. By virtue of circuit path P2, the clamp voltage VC and/or a signal proportional to the clamp voltage VC may be provided at the voltage monitor input V. According to Equation 1 (EQ. 1), the clamp voltage VC may advantageously avail a comprehensive signal which is indicative of the drain-to-source voltage VDS. For instance, Equation 1 shows that the clamp voltage VC may be equal to and/or substantially equal to the drain-to-source voltage VDS and may comprise voltage components.

$$VC = VDS = VB + VOR + VPK \qquad \text{EQ. 1}$$

In Equation 1, the voltage components are the bulk capacitor voltage VB, a reflected voltage VOR from the secondary winding 142, and a peak voltage VPK due to transformer leakage inductance.

Figure 2A:
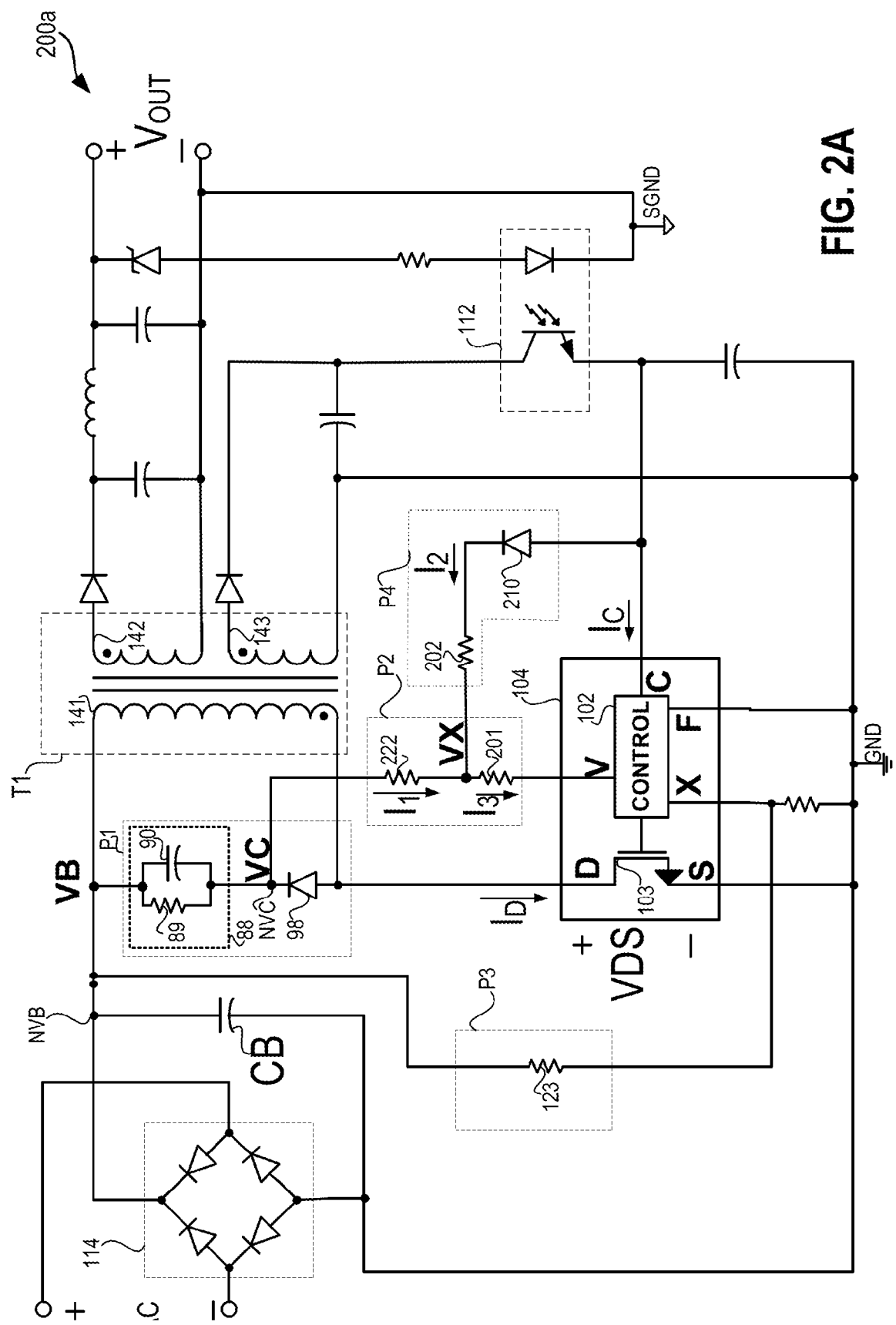
FIG. 2A illustrates a switching power supply including circuit paths according to an embodiment.
Figure 2B:
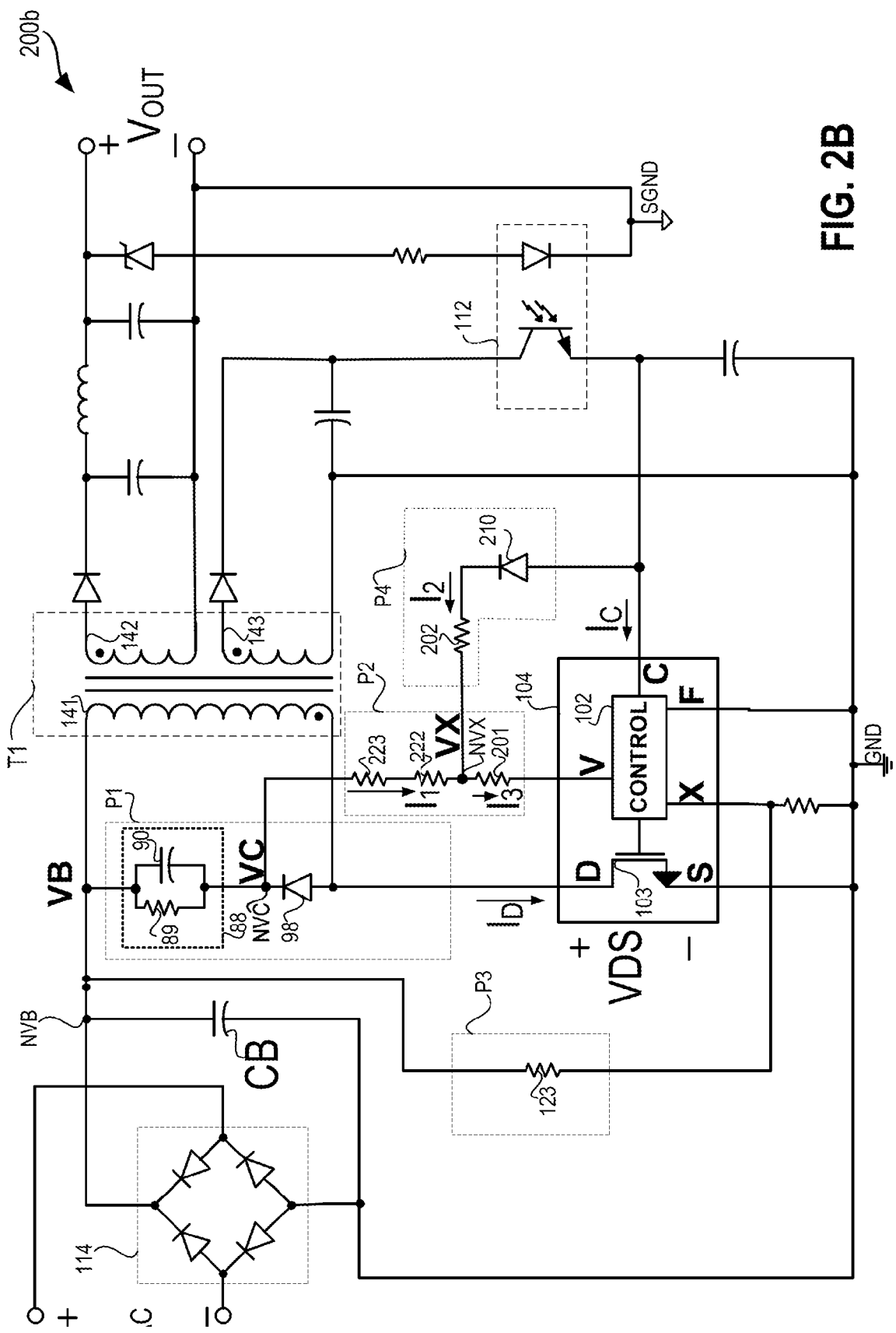
FIG. 2B illustrates a switching power supply including circuit paths according to an embodiment.

FIG. 2A illustrates a switching power supply 200a including circuit paths P1-P4 according to an embodiment; and FIG. 2B illustrates a switching power supply 200b including circuit paths P1-P4 according to an embodiment. In switching power supplies 200a-200b, the circuit path P2 comprises resistor 201 and resistor 222 connected in series between the circuit path node NVC and the voltage monitor input V. As illustrated resistor 201 and resistor 222 are electrically coupled together at a circuit path node NVX; accordingly, circuit path P2 also comprises the circuit path node NVX.

Also as illustrated, switching power supplies 200a-200b further comprise a circuit path P4 connected between the control input C and the circuit path node NVX. Circuit path P4 includes a resistor 202 and a diode 210 electrically coupled in series between the control input C and the circuit path node NVX.

Circuit path P4 may advantageously provide an additional degree of freedom for adjusting a voltage received at the voltage monitor input V. For instance, resistors 201, 202, 222 may be selected so as to adjust the voltage VX provided at circuit path node NVX. As illustrated the voltage VX may be determined, at least in part, by a relationship between currents $I_1$ and $I_3$ (of circuit path 2) and current $I_2$ (of circuit path 4).

In some applications having an additional degree of freedom to adjust the voltage VX and/or current $I_3$ (of circuit path 2) may advantageously improve an undervoltage condition. For instance, when the switcher core module 104 is a TOPSwitch™ integrated circuit, then the current 12 of circuit path 4 may advantageously reduce the value of an undervoltage limit.

In switching power supply 200b circuit path P2 includes an additional resistor 223 electrically connected in series with resistor 222.

FIG. 3A illustrates waveforms 302a-303a corresponding to clamp voltage VC and to drain-to-source voltage VDS, respectively, according to a first embodiment. FIG. 3A also shows trace ground levels 304a-305a for clamp voltage VC and for drain-to-source voltage VDS, respectively; and the time scale is set at 10 milliseconds per division (10 ms/div). The first embodiment may correspond with any one of switching power supplies 100a-100c having a line voltage (i.e., AC voltage $V_{AC}$) of 220 volts.

The switcher core module 104 may be a TOPSwitch™ integrated circuit. For instance, it may be a TOPSwitch™-JX switcher core module. (TOPSwitch™ and TOPSwitch™-JX are trademarks of Power Integrations, Inc., 5245 Hellyer Ave., San Jose, CA 95138). Additionally, the first embodiment may further correspond with an open-loop configuration whereby the switcher core module 104 is forced to operate in open loop (i.e., with the feedback open). For instance, an open loop condition may be forced by having the switcher core module 104 operate with a fixed signal at the control input C.

Also, with reference to FIG. 1C, resistor 89 may be a 2 Watt (2 W) 68 kilo-ohm (Kohm) resistor. Capacitor 90 may be a 1 kilo-volt (KV) 2.2 nano-Farad (nF) capacitor. Diode 98 may be a clamping diode; and resistor 122 may be a 4 Meg-ohm (Mohm) resistor. Measurements (see, e.g., vertical trace 306a and horizontal trace 301a) may indicate at least the following: auto restart occurs when the line voltage is equal to and/or substantially equal to 264 volts; the clamp voltage VC is limited to a maximum value of 504 volts; and the drain-to-source voltage VDS is limited to a maximum of 512 volts. In this regard an OVP trigger voltage (limit with feedback open) may be identified with a maximum clamp voltage (VCMAX) of 504 volts and a maximum drain voltage (VDSMAX) of 512 volts.

FIG. 3B illustrates waveforms 302b-303b corresponding to clamp voltage VC and to drain-to-source voltage VDS, respectively, according to the first embodiment. FIG. 3B also shows a trace ground level 304b for clamp voltage VC; the time scale is magnified to 10 microseconds per division (10 us/div). Trace marker 310b indicates a clamp voltage VC having a value equal to and/or substantially equal to 450 volts.

FIG. 4A illustrates waveforms 402a-403a corresponding to clamp voltage VC and to drain-to-source voltage VDS, respectively, according to a second embodiment. FIG. 4A also shows trace ground levels 404a-405a for clamp voltage VC and for drain-to-source voltage VDS, respectively; and the time scale is set at 10 milliseconds per division (10 ms/div). The second embodiment may correspond with any one of switching power supplies 100a-100c having a line voltage (i.e., AC voltage $V_{AC}$) of 248 volts. Additionally, the switcher core module 104 may be a TOPSwitch™ integrated circuit such as a TOPSwitch™-JX switcher core module and may also be forced to operate with feedback open (i.e., in an open-loop condition).

Also, with reference to FIG. 1C, resistor 89 may be a 2 Watt (2 W) 68 kilo-ohm (Kohm) resistor. Capacitor 90 may be a 1 kilo-volt (KV) 2.2 nano-Farad (nF) capacitor. Diode 98 may be a clamping diode; and resistor 122 may be a 4 Meg-ohm (Mohm) resistor. Measurements (see, e.g., vertical trace 406a and horizontal trace 401a) may indicate at least the following: auto restart occurs when the line voltage is equal to and/or substantially equal to 248 volts; the clamp voltage VC is limited to a maximum value of 496 volts; and the drain-to-source voltage VDS is limited to a maximum of 504 volts. In this regard an OVP trigger voltage (limit with feedback open) may be identified with a maximum clamp voltage (VCMAX) of 496 volts and a maximum drain voltage (VDSMAX) of 504 volts.

FIG. 4B illustrates waveforms 402b-403b corresponding to clamp voltage VC and to drain-to-source voltage VDS, respectively, according to the second embodiment. FIG. 4B also shows a trace ground level 404b for clamp voltage VC; the time scale is magnified to 10 microseconds per division (10 us/div).

Figure 5A:
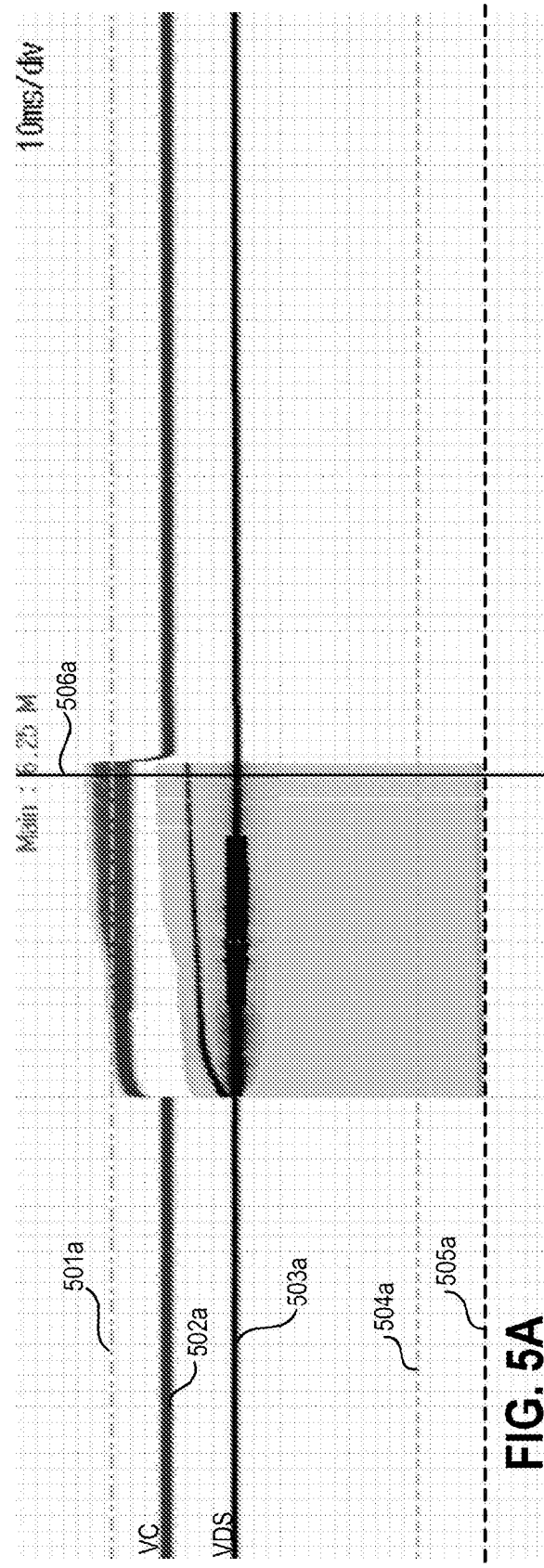
FIG. 5A illustrates waveforms corresponding to clamp voltage VC and to primary side switch drain-to-source voltage VDS according to a third embodiment.

FIG. 5A illustrates waveforms 502a-503a corresponding to clamp voltage VC and to drain-to-source voltage VDS, respectively, according to a third embodiment. FIG. 5A also shows trace ground levels 504a-505a for clamp voltage VC and for drain-to-source voltage VDS, respectively; and the time scale is set at 10 milliseconds per division (10 ms/div). The third embodiment may correspond with any one of switching power supplies 100a-100c having a line voltage (i.e., AC voltage $V_{AC}$) of 264 volts. Additionally, the switcher core module 104 may be a TOPSwitch™ integrated circuit such as a TOPSwitch™-JX switcher core module and may also be forced to operate with feedback open (i.e., in an open-loop condition).

Also, with reference to FIG. 1C, resistor 89 may be a 2 Watt (2 W) 68 kilo-ohm (Kohm) resistor. Capacitor 90 may be a 1 kilo-volt (KV) 2.2 nano-Farad (nF) capacitor. Diode 98 may be a clamping diode; and resistor 122 may be a 4 Meg-ohm (Mohm) resistor.

Measurements (see, e.g., vertical trace 506a and horizontal trace 501a) may indicate at least the following: auto restart occurs when the line voltage is equal to and/or substantially equal to 264 volts: the clamp voltage VC is limited to a maximum value of 486 volts; and the drain-to-source voltage VDS is limited to a maximum of 492 volts. In this regard an OVP trigger voltage (limit with feedback open) may be identified with a maximum clamp voltage (VCMAX) of 486 volts and a maximum drain voltage (VDSMAX) of 492 volts.

Figure 5B:
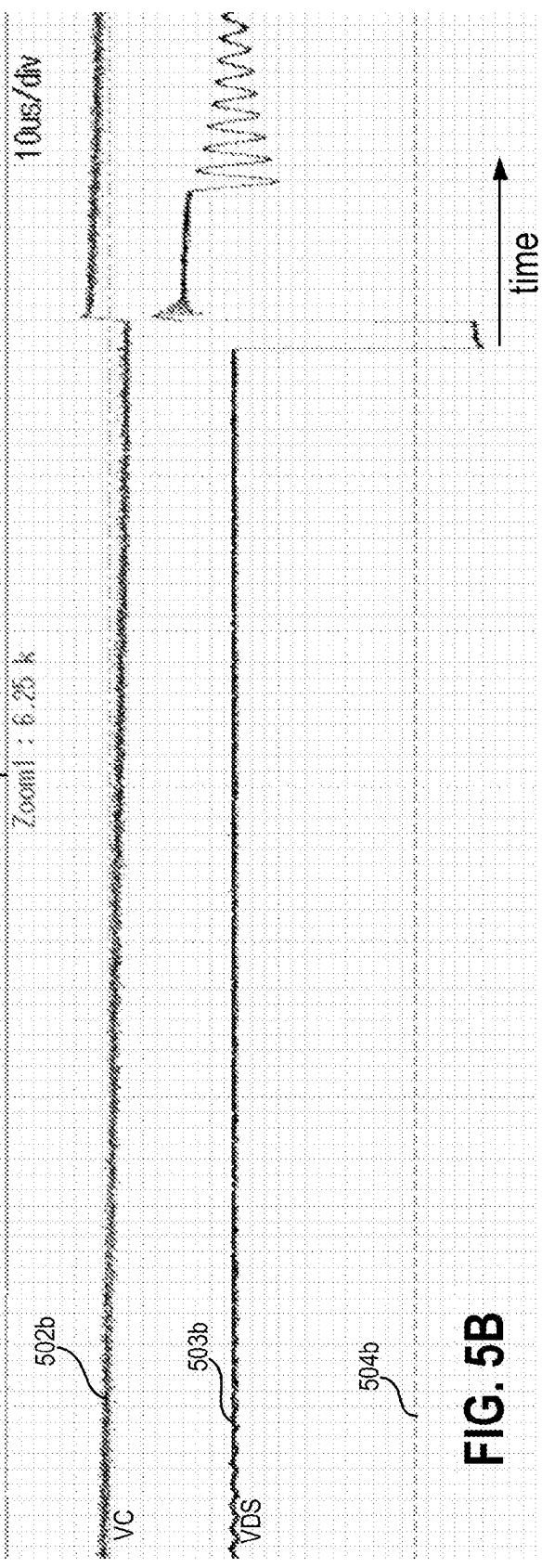
FIG. 5B illustrates waveforms corresponding to clamp voltage VC and to primary side switch drain-to-source voltage VDS according to the third embodiment.

FIG. 5B illustrates waveforms 502b-503b corresponding to clamp voltage VC and to drain-to-source voltage VDS, respectively, according to the third embodiment. FIG. 5B also shows a trace ground level 504b for clamp voltage VC; the time scale is magnified to 10 microseconds per division (10 us/div).

FIG. 6A illustrates waveforms 602a-603a corresponding to clamp voltage VC and to drain-to-source voltage VDS, respectively, according to a fourth embodiment. FIG. 6A also shows trace ground levels 604a-605a for clamp voltage VC and for drain-to-source voltage VDS, respectively; and the time scale is set at 10 milliseconds per division (10 ms/div). The fourth embodiment may correspond with any one of switching power supplies 100a-100c having a line voltage (i.e., AC voltage $V_{AC}$) of 260 volts and operating under a zero Watt (0W) load condition. Additionally, the switcher core module 104 may be a TOPSwitch™ integrated circuit such as a TOPSwitch™-JX switcher core module and may also be forced to operate with feedback open (i.e., in an open-loop condition).

Also, with reference to FIG. 1C, resistor 89 may be a 2 Watt (2 W) 68 kilo-ohm (Kohm) resistor. Capacitor 90 may be a 1 kilo-volt (KV) 2.2 nano-Farad (nF) capacitor. Diode 98 may be a clamping diode; and resistor 122 may be a 4 Meg-ohm (Mohm) resistor. For a line voltage of 260 volts and a 0 Watt load, measurements (see, e.g., vertical trace 606a and horizontal trace 601a) may indicate at least the following: the clamp voltage VC is limited to a maximum value of 491 volts; and the drain-to-source voltage VDS is limited to a maximum of 497 volts. In this regard an OVP trigger voltage (limit with feedback open) may be identified with a maximum clamp voltage (VCMAX) of 491 volts and a maximum drain voltage (VDSMAX) of 497 volts.

FIG. 6B illustrates waveforms 602b-603b corresponding to clamp voltage VC and to drain-to-source voltage VDS, respectively, according to the fourth embodiment. FIG. 6B also shows a trace ground level 604b for clamp voltage VC; the time scale is magnified to 10 microseconds per division (10 us/div).

Figure 7A:
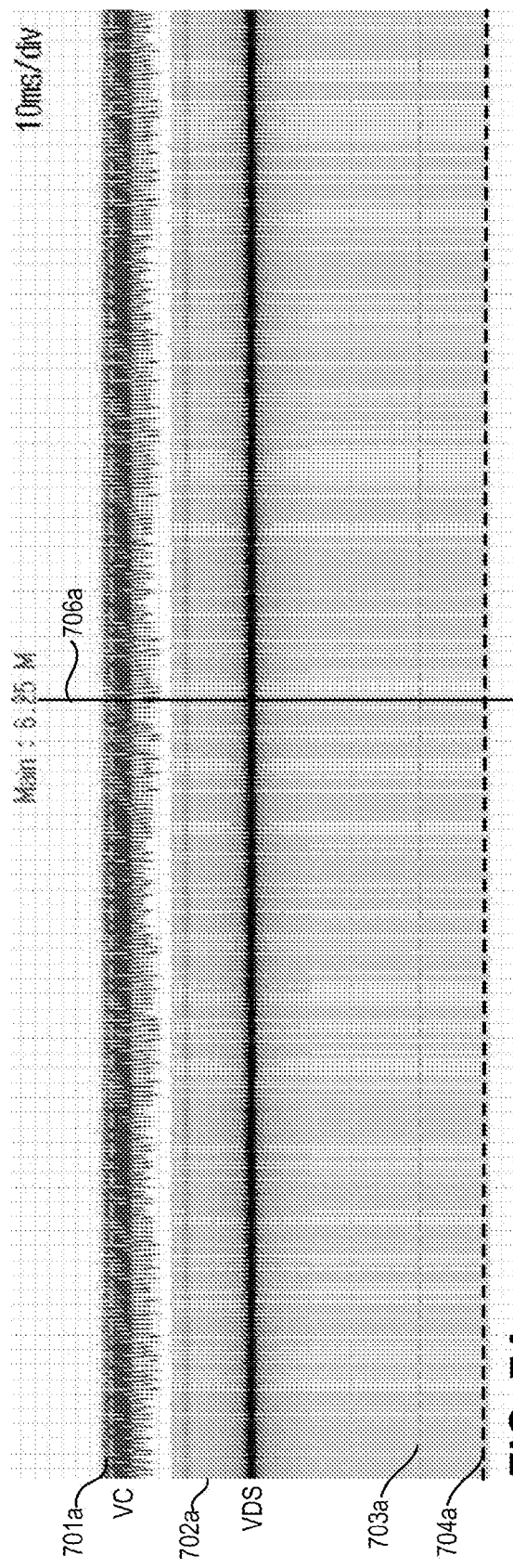
FIG. 7A illustrates waveforms corresponding to clamp voltage VC and to primary side switch drain-to-source voltage VDS according to a fifth embodiment.

FIG. 7A illustrates waveforms 702a-703a corresponding to clamp voltage VC and to drain-to-source voltage VDS, respectively, according to a fifth embodiment. FIG. 7A also shows trace ground levels 704a-705a for clamp voltage VC and for drain-to-source voltage VDS, respectively; and the time scale is set at 10 milliseconds per division (10 ms/div). The fifth embodiment may correspond with any one of switching power supplies 100a-100c having a line voltage (i.e., AC voltage $V_{AC}$) of 248 volts and operating under a zero Watt (0W) load condition. Additionally, the switcher core module 104 may be a TOPSwitch™ integrated circuit such as a TOPSwitch™ _JX switcher core module and may also be forced to operate with feedback open (i.e., in an open-loop condition).

Also, with reference to FIG. 1C, resistor 89 may be a 2 Watt (2 W) 68 kilo-ohm (Kohm) resistor. Capacitor 90 may be a 1 kilo-volt (KV) 2.2 nano-Farad (nF) capacitor. Diode 98 may be a clamping diode; and resistor 122 may be a 4 Meg-ohm (Mohm) resistor. For a line voltage of 248 volts and a 0 Watt load, measurements (see, e.g., vertical trace 706a and horizontal trace 701a) may indicate at least the following: the clamp voltage VC is limited to a maximum value of 464 volts; and the drain-to-source voltage VDS is limited to a maximum of 476 volts. In this regard an OVP trigger voltage (limit with feedback open) may be identified with a maximum clamp voltage (VCMAX) of 464 volts and a maximum drain voltage (VDSMAX) of 476 volts. However, in contrast to the waveforms 602a-603a of FIG. 6A, waveforms 702a-703a indicate the "power supply operates normally" without exhibiting OVP because the line voltage (i.e., AC voltage $V_{AC}$) has been reduced from 260 volts to 248 volts.

Figure 7B:
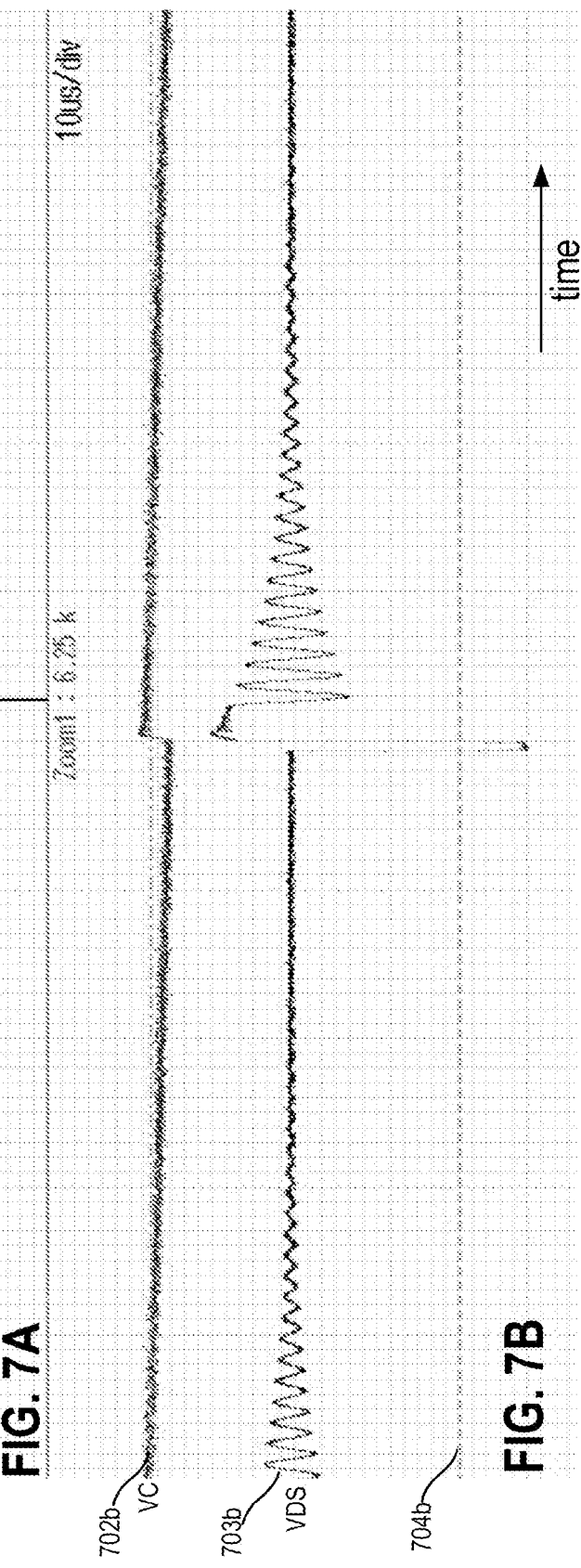
FIG. 7B illustrates waveforms corresponding to clamp voltage VC and to primary side switch drain-to-source voltage VDS according to the fifth embodiment.

FIG. 7B illustrates waveforms 702b-703b corresponding to clamp voltage VC and to drain-to-source voltage VDS, respectively, according to the fifth embodiment. FIG. 7B also shows a trace ground level 704b for clamp voltage VC; the time scale is magnified to 10 microseconds per division (10 us/div).

FIG. 8A illustrates waveforms 802a-803a corresponding to clamp voltage VC and to drain-to-source voltage VDS, respectively, according to a sixth embodiment. FIG. 8A also shows trace ground levels 804a-805a for clamp voltage VC and for drain-to-source voltage VDS, respectively; and the time scale is set at 10 milliseconds per division (10 ms/div). The sixth embodiment may correspond with any one of switching power supplies 100a-100c having a line voltage (i.e., AC voltage $V_{AC}$) of 223 volts and operating under a five Watt (5 W) load condition. Additionally, the switcher core module 104 may be a TOPSwitch™ integrated circuit such as a TOPSwitch™-JX switcher core module and may also be forced to operate with feedback open (i.e., in an open-loop condition).

Also, with reference to FIG. 1C, resistor 89 may be a 2 Watt (2 W) 68 kilo-ohm (Kohm) resistor. Capacitor 90 may be a 1 kilo-volt (KV) 2.2 nano-Farad (nF) capacitor. Diode 98 may be a clamping diode; and resistor 122 may be a 4 Meg-ohm (Mohm) resistor. For a line voltage of 223 volts and a 5 Watt load, measurements (see, e.g., vertical trace 806a and horizontal trace 801a) may indicate at least the following: the clamp voltage VC is limited to a maximum value of 472 volts; and the drain-to-source voltage VDS is limited to a maximum of 476 volts. In this regard an OVP trigger voltage (limit with feedback open) may be identified with a maximum clamp voltage (VCMAX) of 472 volts and a maximum drain voltage (VDSMAX) of 476 volts.

FIG. 8B illustrates waveforms 802b-803b corresponding to clamp voltage VC and to drain-to-source voltage VDS, respectively, according to the sixth embodiment. FIG. 8B also shows a trace ground level 804b for clamp voltage VC; the time scale is magnified to 10 microseconds per division (10 us/div).

Figure 9A:
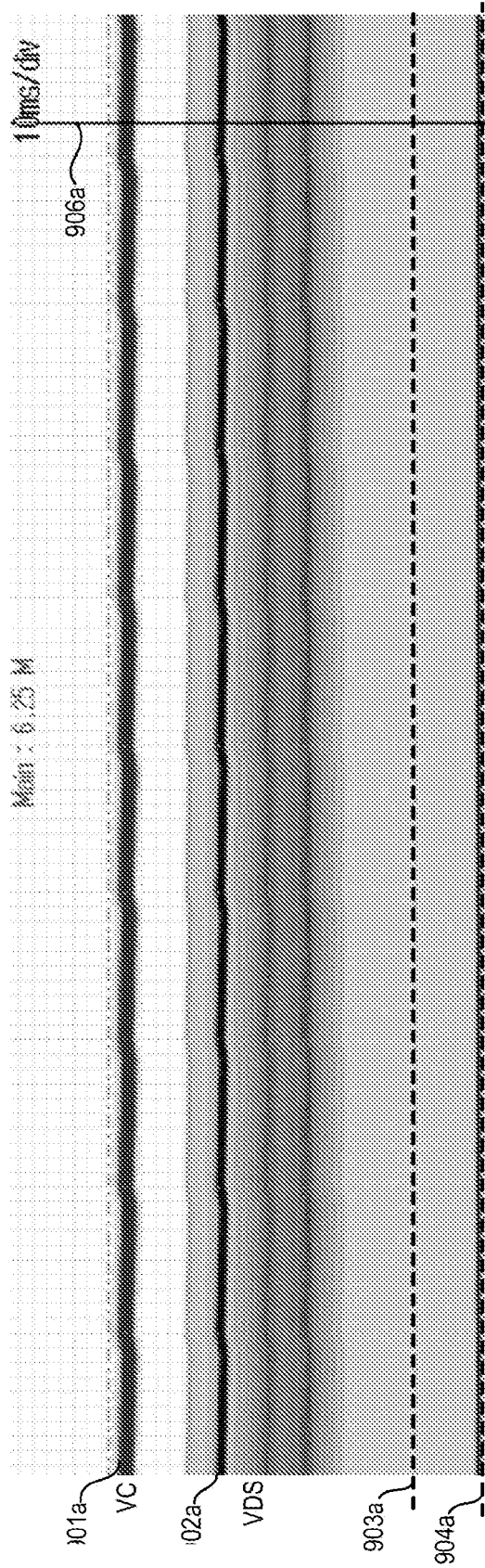
FIG. 9A illustrates waveforms corresponding to clamp voltage VC and to primary side switch drain-to-source voltage VDS according to a seventh embodiment.

FIG. 9A illustrates waveforms 902a-903a corresponding to clamp voltage VC and to drain-to-source voltage VDS, respectively, according to a seventh embodiment. FIG. 9A also shows trace ground levels 904a-905a for clamp voltage VC and for drain-to-source voltage VDS, respectively; and the time scale is set at 10 milliseconds per division (10 ms/div). The seventh embodiment may correspond with any one of switching power supplies 100a-100c having a line voltage (i.e., AC voltage $V_{AC}$) of 210 volts and operating under a five Watt (5 W) load condition. Additionally, the switcher core module 104 may be a TOPSwitch™ integrated circuit such as a TOPSwitch™-JX switcher core module and may also be forced to operate with feedback open (i.e., in an open-loop condition).

Also, with reference to FIG. 1C, resistor 89 may be a 2 Watt (2 W) 68 kilo-ohm (Kohm) resistor. Capacitor 90 may be a 1 kilo-volt (KV) 2.2 nano-Farad (nF) capacitor. Diode 98 may be a clamping diode; and resistor 122 may be a 4 Meg-ohm (Mohm) resistor. For a line voltage of 210 volts and a 5 Watt load, measurements (see, e.g., vertical trace 906a and horizontal trace 901a) may indicate at least the following: the clamp voltage VC is limited to a maximum value of 440 volts; and the drain-to-source voltage VDS is limited to a maximum of 451 volts. In this regard an OVP trigger voltage (limit with feedback open) may be identified with a maximum clamp voltage (VCMAX) of 440 volts and a maximum drain voltage (VDSMAX) of 451 volts. However, in contrast to the waveforms 802a-803a of FIG. 8A, waveforms 902a-903a indicate the "power supply operates normally" without exhibiting OVP because the line voltage (i.e., AC voltage $V_{AC}$) has been reduced from 223 volts to 210 volts.

Figure 9B:
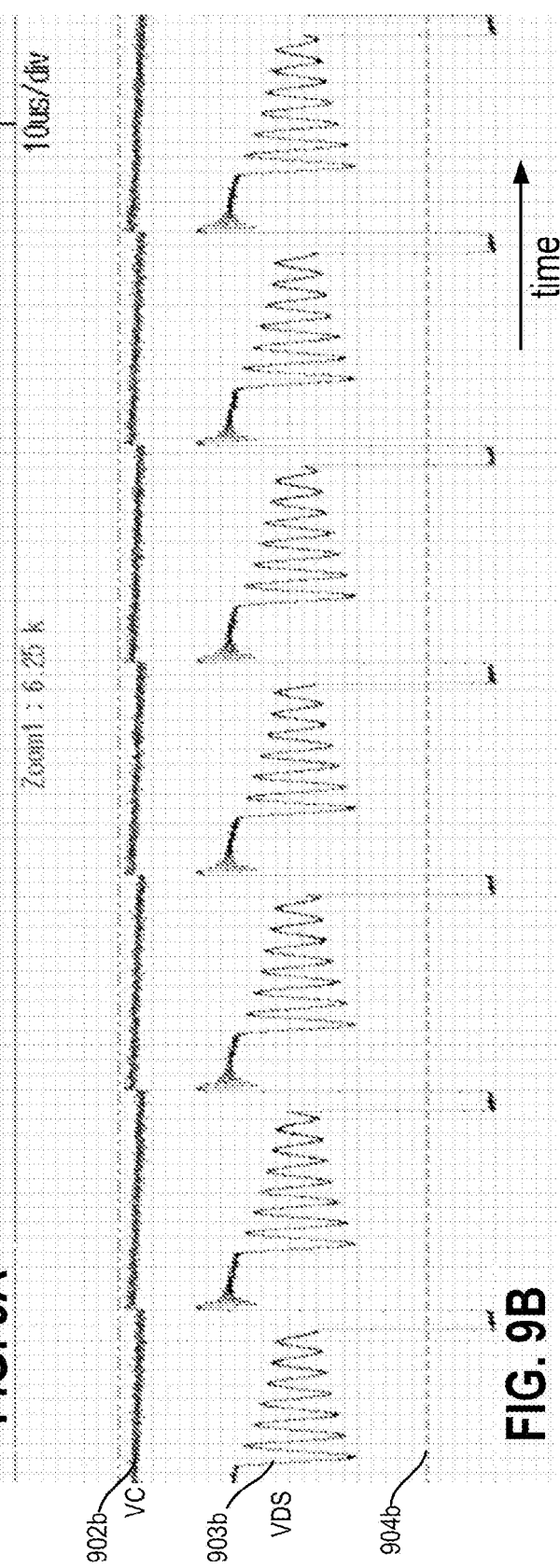
FIG. 9B illustrates waveforms corresponding to clamp voltage VC and to primary side switch drain-to-source voltage VDS according to the seventh embodiment.

FIG. 9B illustrates waveforms 902b-903b corresponding to clamp voltage VC and to drain-to-source voltage VDS, respectively, according to the seventh embodiment. FIG. 9B also shows a trace ground level 904b for clamp voltage VC; the time scale is magnified to 10 microseconds per division (10 us/div).

FIG. 10A illustrates waveforms 1002a-1003a corresponding to clamp voltage VC and to drain-to-source voltage VDS, respectively, according to an eighth embodiment. FIG. 10A also shows trace ground level 1005a for drain-to-source voltage VDS; and the time scale is set at 10 milliseconds per division (10 ms/div). The eight embodiment may correspond with any one of switching power supplies 100a-100c having a line voltage (i.e., AC voltage $V_{AC}$) of 215 volts and operating under a ten Watt (10 W) load condition. Additionally, the switcher core module 104 may be a TOPSwitch™ integrated circuit such as a TOPSwitch™-JX switcher core module and may also be forced to operate with feedback open (i.e., in an open-loop condition).

Also, with reference to FIG. 1C, resistor 89 may be a 2 Watt (2 W) 68 kilo-ohm (Kohm) resistor. Capacitor 90 may be a 1 kilo-volt (KV) 2.2 nano-Farad (nF) capacitor. Diode 98 may be a clamping diode; and resistor 122 may be a 4 Meg-ohm (Mohm) resistor. For a line voltage of 215 volts and a 10 Watt load, measurements (see, e.g., vertical trace 1006a and horizontal trace 1001a) may indicate at least the following: the clamp voltage VC is limited to a maximum value of 471 volts; and the drain-to-source voltage VDS is limited to a maximum of 476 volts. In this regard an OVP trigger voltage (limit with feedback open) may be identified with a maximum clamp voltage (VCMAX) of 471 volts and a maximum drain voltage (VDSMAX) of 476 volts.

FIG. 10B illustrates waveforms 1002b-1003b corresponding to clamp voltage VC and to drain-to-source voltage VDS, respectively, according to the eighth embodiment. FIG. 10B also shows a trace ground level 1004b for clamp voltage VC; the time scale is magnified to 10 microseconds per division (10 us/div).

Figure 11A:
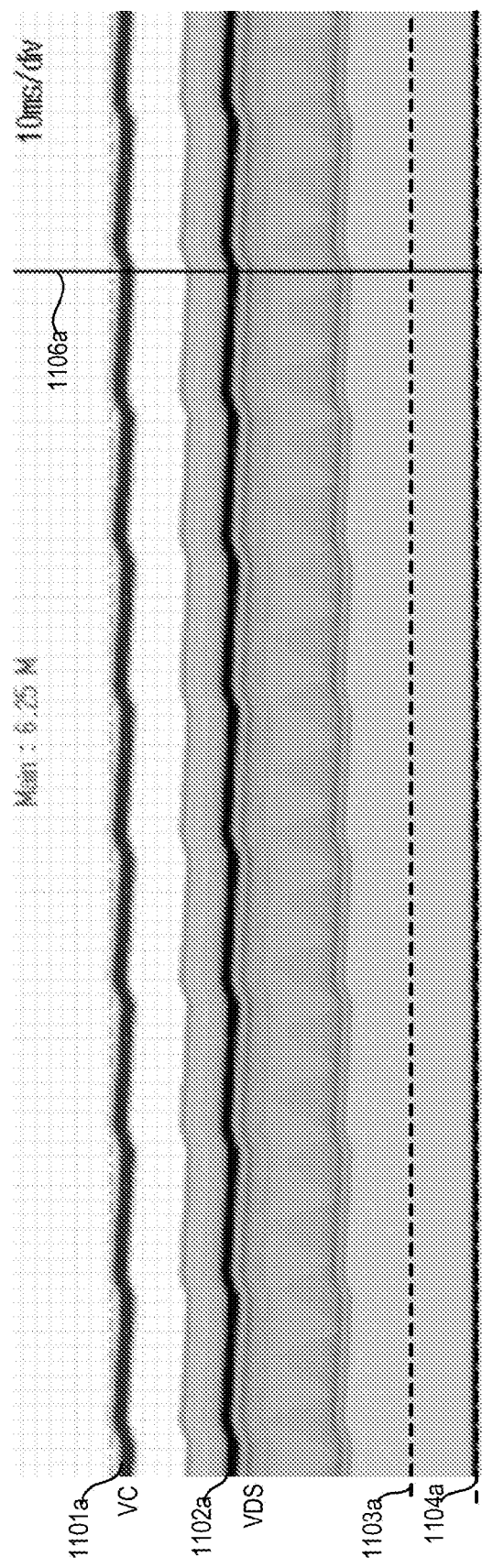
FIG. 11A illustrates waveforms corresponding to clamp voltage VC and to primary side switch drain-to-source voltage VDS according to a ninth embodiment.

FIG. 11A illustrates waveforms 1102a-1103a corresponding to clamp voltage VC and to drain-to-source voltage VDS, respectively, according to a ninth embodiment. FIG. 11A also shows trace ground levels 1104a-1105a for clamp voltage VC and for drain-to-source voltage VDS, respectively; and the time scale is set at 10 milliseconds per division (10 ms/div). The ninth embodiment may correspond with any one of switching power supplies 100a-100c having a line voltage (i.e., AC voltage $V_{AC}$) of 204 volts and operating under a 10 Watt (10 W) load condition. Additionally, the switcher core module 104 may be a TOPSwitch™ integrated circuit such as a TOPSwitch™-JX switcher core module and may also be forced to operate with feedback open (i.e., in an open-loop condition).

Also, with reference to FIG. 1C, resistor 89 may be a 2 Watt (2 W) 68 kilo-ohm (Kohm) resistor. Capacitor 90 may be a 1 kilo-volt (KV) 2.2 nano-Farad (nF) capacitor. Diode 98 may be a clamping diode; and resistor 122 may be a 4 Meg-ohm (Mohm) resistor. For a line voltage of 204 volts and a 10 Watt load, measurements (see, e.g., vertical trace 1106a and horizontal trace 1101a) may indicate at least the following: the clamp voltage VC is limited to a maximum value of 448 volts; and the drain-to-source voltage VDS is limited to a maximum of 460 volts. In this regard an OVP trigger voltage (limit with feedback open) may be identified with a maximum clamp voltage (VCMAX) of 448 volts and a maximum drain voltage (VDSMAX) of 460 volts. However, in contrast to the waveforms 1002a-1003a of FIG. 10A, waveforms 1102a-1103a indicate the "power supply operates normally" without exhibiting OVP because the line voltage (i.e., AC voltage $V_{AC}$) has been reduced from 215 volts to 204 volts.

Figure 11B:
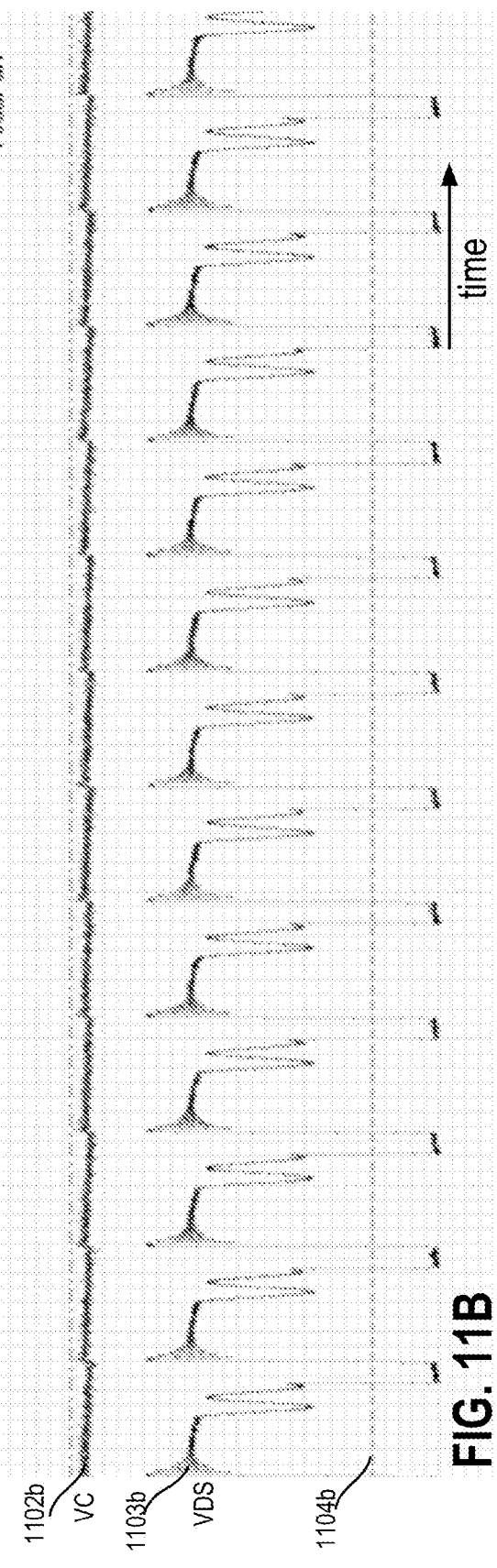
FIG. 11B illustrates waveforms corresponding to clamp voltage VC and to primary side switch drain-to-source voltage VDS according to the ninth embodiment.

FIG. 11B illustrates waveforms 1102b-1103b corresponding to clamp voltage VC and to drain-to-source voltage VDS, respectively, according to the seventh embodiment. FIG. 11B also shows a trace ground level 1104b for clamp voltage VC; the time scale is magnified to 10 microseconds per division (10 us/div).

FIG. 12A illustrates waveforms 1202a-1203a corresponding to clamp voltage VC and to drain-to-source voltage VDS, respectively, according to a tenth embodiment. FIG. 12A also shows trace ground levels 1204a-1205a for clamp voltage VC and for drain-to-source voltage VDS, respectively; and the time scale is set at 200 milliseconds per division (200 ms/div). The tenth embodiment may correspond with any one of switching power supplies 100a-100c having a line voltage (i.e., AC voltage $V_{AC}$) of 307 volts. Additionally, the switcher core module 104 may be a TOPSwitch™ integrated circuit such as a TOPSwitch™-JX switcher core module and may also be forced to operate with feedback open (i.e., in an open-loop condition).

Also, with reference to FIG. 1C, resistor 89 may be a 2 Watt (2 W) 68 kilo-ohm (Kohm) resistor. Capacitor 90 may be a 1 kilo-volt (KV) 2.2 nano-Farad (nF) capacitor. Diode 98 may be a clamping diode; and the resistance of resistor 122 may be increased from 4 Meg-ohm (Mohm) to 5.2 Mohm.

For a line voltage of 307 volts, measurements (see, e.g., vertical trace 1206a and horizontal trace 1201a) may indicate at least the following: the clamp voltage VC is limited to a maximum value of 616 volts; and the drain-to-source voltage VDS is limited to a maximum of 623 volts. In this regard an OVP trigger voltage (limit with feedback open) may be identified with a maximum clamp voltage (VCMAX) of 616 volts and a maximum drain voltage (VDSMAX) of 623 volts.

For reference, a calculated value for the maximum clamp voltage VCMAX can be determined by the resistance of resistor 122 (i.e. 5.2 Mohm) per the following equation (EQ. 2):

$$VCMAX = 5.2 \text{Mohm} \times 112.5 = 585 \text{ Volts} \qquad \text{EQ. 2}$$

Therefore, an estimate of VCMAX (i.e., 585 volts) is within 31 volts of the experimentally determined value of 616 volts. Also, if the primary side switch 103 has a maximum drain voltage rating of 725 volts, then the primary side switch 103 may functionally be protected with a margin equal to 725 volts minus 623 volts (i.e., with a margin of 102 volts).

FIG. 12B illustrates waveforms 1202b-1203b corresponding to clamp voltage VC and to drain-to-source voltage VDS, respectively, according to the tenth embodiment. The time scale is magnified to 20 microseconds per division (20 us/div).

Further enhancements relating to reducing an undervoltage threshold may also be explored with respect to the tenth embodiment of FIG. 12A and FIG. 12B. For instance, by using the circuit path P4 of FIG. 2A or FIG. 2B, the undervoltage threshold may advantageously be lowered while maintaining (or substantially maintaining) a maximum clamp voltage VCMAX of 616 volts.

With reference to FIG. 2B and the tenth embodiment of FIGS. 12A-12B, the circuit path P4 may be used to adjust an undervoltage limit VUVP according to the below design example(s) seeking an undervoltage limit VUVP equal to 100 volts.

Assuming the resistances of resistors 201, 202, 222, 223 are given by R201, R202, R222, and R223 respectively, and the value of current $I_3$ is 25 microamperes (uA), an example set of calculations for resistance R202 may be given by the set of design equations (EQs. 3).

$$[\text{ASSUME:} V=2.8V; VD=4.87V;$$
$$I3=25uA @ Vuvp=100V]$$

$$VX=?$$

$$(VX-V)/R201=I3=25 \ uA$$

$$\rightarrow VX=3.55 \ V$$

$$I1=?$$

$$I1=(Vuvp-VX)/(R222+R223)$$

$$I1=(100-3.55)/5.2 \ \text{Mohm}=18.55 \ uA$$

$$I2=?$$

$$I1+I2=25 \ uA$$

$$I2=25-I1=25-18.55=6.45 \ uA$$

$$R202=?$$

$$R202=(VD-VX)/I2$$

$$\rightarrow RX=205 \ \text{Kohm} \quad\quad \text{EQs. 3}$$

In the above set of equations EQs. 3, the voltage VD may correspond to the voltage at the cathode of diode 210 and the voltage V may correspond to the voltage at the voltage monitor input V. If the value of the sum of R222 and R223 increases, say to 6 Mega-ohms (6 Mohms), then the value of R202 may be recalculated to be equal to 147 kilo-ohms (Kohms).

In one aspect, a power supply (i.e., any of the switching power supplies 100a-100c, 200a-200b), comprises: a bridge rectifier (e.g., bridge rectifier 114), a primary side switch (e.g., primary side switch 103), and a controller (e.g., controller 102). The bridge rectifier is configured to provide a rectified alternating current (AC) voltage (VB) to a first node (NVB). The primary side switch comprises a drain (D); the drain is electrically coupled to the first node via a first circuit path (i.e., circuit path P1). The first circuit path comprises a first circuit path node (i.e., circuit path node NVC) between the first node and the drain. The controller is configured to control the primary side switch according to a switching cycle (e.g., waveform 160 of FIG. 1A). The controller comprises a voltage monitor input (i.e., voltage monitor input V) electrically coupled to the first circuit path node via a second circuit path (i.e., circuit path P2). The second circuit path is configured to provide a monitor voltage (V) to the voltage monitor input (V). (See, e.g., para and EQs. 3 where V=2.8 volts).

The controller 102 may force the primary side switch to stop switching in response to the monitor voltage exceeding an overvoltage limit (e.g., VCMAX, VDSMAX). The controller 102 may force the primary side switch to continuously conduct (i.e., to remain "on" or in its "on-state") when the monitor voltage is less than the undervoltage threshold (e.g., less than voltage $V_{UVP}$). The controller may comprise a current limit input (i.e., current monitor input X). The current limit input (i.e., current monitor input X) may be electrically coupled to the first node via a third circuit path (i.e., circuit path P3). The first node (NVB) may be electrically coupled to a capacitor bulk capacitor (CB).

A switcher core module 104 may comprise the controller 102 and the primary side switch 103. The switcher core module 104 may be a TOPSwitch™ switcher core module. The first circuit path node (NVC) may be configured to provide a clamp voltage (VC). The clamp voltage may be substantially equal to the drain-to-source voltage (VDS) of the primary side switch (EQ. 1). The second circuit path may further comprise a second circuit path node (NVX) between the first circuit path node and the voltage monitor input. The controller may further comprise a control input C electrically coupled to the second circuit path node (NVX) via a fourth circuit path (i.e., circuit path P4).

The above description of illustrated examples of the present disclosure, including what is described in the Abstract, are not intended to be exhaustive or to be limitation to the precise forms disclosed. For instance, although the embodiments illustrate a primary side switch which is realized with a field effect transistor (FET) comprising a gate, source, and drain, other embodiments of process technologies are possible. As one of ordinary skill in the art may appreciate, primary side switches may be realized with other types of switches including insulated gate bipolar transistors (IGBTs) and/or bipolar junction transistors (BJTs).

While specific embodiments of, and examples of a circuit path configuration for enhancing overvoltage protection in a switching power supply are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings herein.

The invention claimed is:

1. A power supply comprising:
    a bridge rectifier configured to provide a rectified alternating current (AC) voltage to a first node;
    a primary side switch comprising a drain, the drain electrically coupled to the first node via a first circuit path, the first circuit path comprising a first circuit path node between the first node and the drain; and
    a controller configured to control the primary side switch according to a switching waveform, the controller comprising a voltage monitor input electrically coupled to the first circuit path node via a second circuit path, the second circuit path configured to provide a monitor voltage to the voltage monitor input and comprising a second circuit path node configured to provide a node voltage according to a relationship between a first current, a second current, and a third current,
    wherein the second circuit path is configured to provide the first current and the third current, and the second circuit path node is between the first circuit path node and the voltage monitor input, and wherein the controller further comprises a control input, the control input electrically coupled to the second circuit path node via a fourth circuit path configured to provide the second current.

2. The power supply of claim 1, wherein the controller is configured to force the primary side switch to stop switching in response to the monitor voltage exceeding an overvoltage threshold.

3. The power supply of claim 1, wherein the controller is configured to force the primary side switch to continuously conduct while the monitor voltage is less than an undervoltage threshold.

4. The power supply of claim 1, wherein the controller further comprises a current limit input, the current limit input electrically coupled to the first node via a third circuit path.

5. The power supply of claim 1, wherein the first node is electrically coupled to a bulk capacitor.

6. The power supply of claim 1, wherein a switcher core module comprises the controller and the primary side switch.

7. The power supply of claim 1, wherein the first circuit path node is configured to provide a clamp voltage.

8. The power supply of claim 7, wherein the clamp voltage is substantially equal to a drain-to-source voltage of the primary side switch.

9. A switching power supply comprising:
a primary switch comprising a gate, a source, and a drain and configured to receive a drain-to-source voltage between the source and the drain;
a first circuit path comprising a first circuit path node and electrically coupled between a first node and the drain, the first node configured to receive a rectified alternating current (AC) voltage;
a second circuit path electrically coupled with the first circuit path and comprising a second circuit path node; and
a controller comprising a voltage monitor input electrically coupled to the first circuit path node via the second circuit path and configured to drive the gate according to a switching cycle, wherein the first circuit path node is configured to provide a clamp voltage having comprehensive information indicative of the drain-to-source voltage, wherein the second circuit path node is configured to provide a node voltage determined, at least in part, by a first current, a second current, and a third current, wherein the second circuit path is configured to provide the first current and the third current, and the second circuit path node is between the first circuit path node and the voltage monitor input, and wherein the controller further comprises a control input, the control input electrically coupled to the second circuit path node via a fourth circuit path, the fourth circuit path comprising a resistor and configured to provide the second current.

10. The switching power supply of claim 9,
wherein the second circuit path provides a monitor voltage to the voltage monitor input; and
wherein the controller is configured to drive the gate of the primary switch to stop switching in response to the monitor voltage exceeding an overvoltage threshold.

11. The switching power supply of claim 10, wherein the controller is configured to drive the gate of the primary switch to continuously conduct while the monitor voltage is less than an undervoltage threshold.

12. The switching power supply of claim 9, wherein the controller further comprises a current limit input, the current limit input electrically coupled to the first node via a third circuit path.

13. The switching power supply of claim 12, wherein the first node is electrically coupled to a bulk capacitor.

14. The switching power supply of claim 9, wherein the clamp voltage is substantially equal to the drain-to-source voltage of the primary switch.

15. The switching power supply of claim 9, wherein the node voltage is further determined, at least in part, by a resistance of the resistor.

* * * * *